(12) United States Patent
Matsuda et al.

(10) Patent No.: US 8,671,421 B2
(45) Date of Patent: Mar. 11, 2014

(54) REPRODUCING DEVICE

(75) Inventors: Mikinori Matsuda, Kanagawa (JP);
Kazuhito Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1140 days.

(21) Appl. No.: 11/986,283

(22) Filed: Nov. 20, 2007

(65) Prior Publication Data
US 2008/0127237 A1 May 29, 2008

(30) Foreign Application Priority Data

Nov. 24, 2006 (JP) ................................. 2006-316581

(51) Int. Cl.
*G11B 17/043* (2006.01)

(52) U.S. Cl.
USPC .......................................... 720/730; 720/631

(58) Field of Classification Search
USPC .................. 720/630, 631, 730, 731
See application file for complete search history.

(56) References Cited

U.S. PATENT DOCUMENTS

| | | | |
|---|---|---|---|
| 3,460,872 A | 8/1969 | Reno et al. | |
| 4,017,902 A | 4/1977 | Sato | |
| 4,777,631 A * | 10/1988 | Kamoshita et al. | 720/631 |
| 5,164,935 A * | 11/1992 | Shimegi et al. | 720/631 |
| 5,325,243 A * | 6/1994 | Rath et al. | 360/71 |
| 5,610,891 A | 3/1997 | Choi | |
| 5,666,343 A * | 9/1997 | Ahn | 720/644 |
| 6,097,686 A | 8/2000 | Yun | |
| 6,181,511 B1 | 1/2001 | Reynolds et al. | |
| 6,188,542 B1 * | 2/2001 | Cheong | 360/99.06 |
| 6,243,686 B1 * | 6/2001 | McPherson et al. | 704/500 |
| 6,307,829 B1 * | 10/2001 | Inoue et al. | 720/689 |
| 6,829,774 B2 * | 12/2004 | Nakashima | 720/640 |
| 7,493,635 B2 * | 2/2009 | Kurita et al. | 720/738 |
| 2003/0103436 A1 * | 6/2003 | Nakashima | 369/77.2 |
| 2004/0177364 A1 * | 9/2004 | Sanada et al. | 720/641 |
| 2005/0210491 A1 * | 9/2005 | Ohgi | 720/725 |
| 2006/0080684 A1 * | 4/2006 | Kasuga | 720/600 |

FOREIGN PATENT DOCUMENTS

| | | |
|---|---|---|
| DE | 1205722 | 11/1965 |
| EP | 1 343 165 A1 | 9/2003 |
| EP | 1 467 365 A2 | 10/2004 |
| JP | 04155655 A * | 5/1992 |
| JP | 06-111445 A | 4/1994 |
| JP | 07-006493 A | 1/1995 |
| JP | 10064226 A * | 3/1998 |
| JP | 2002-175678 A | 6/2002 |
| JP | 2004158125 A * | 6/2004 |
| JP | 2004253034 A * | 9/2004 |
| JP | 2005-322318 | 11/2005 |
| JP | 2005-322359 A | 11/2005 |
| JP | 2006-073160 A | 3/2006 |
| JP | 2006073160 A * | 3/2006 |
| JP | 2006244613 A * | 9/2006 |
| JP | 2006-294186 A | 10/2006 |

* cited by examiner

*Primary Examiner* — Will J Klimowicz
(74) *Attorney, Agent, or Firm* — Wolf, Greenfield & Sacks, P.C.

(57) ABSTRACT

There is provided a reproducing device in which a recording medium cartridge is directly inserted into a mechanical deck and placed on a chassis of the mechanical deck for reproduction. The mechanical deck includes an erroneous insertion-preventing portion which conforms to the curved shape of a front surface of the recording medium cartridge in the insertion direction thereof at the time of the insertion in a normal posture.

23 Claims, 22 Drawing Sheets

REPRODUCING DEVICE

CROSS REFERENCES TO RELATED APPLICATIONS

The present invention contains subject matter related to Japanese Patent Application JP 2006-316581 filed in the Japan Patent Office on Nov. 24, 2006, the entire contents of which being incorporated herein by reference.

BACKGROUND OF THE INVENTION

1. Field of the Invention

The present invention relates generally to reproducing devices being of the so-called holderless type in which a recording medium cartridge is directly loaded to and unloaded from the chassis of a mechanical deck without use of a cartridge holder. In particular, the invention relates to a reproducing device that can prevent erroneous insertion of a recording medium cartridge that is likely to occur because of no use of the cartridge holder.

2. Description of the Related Art

There is known a recording-reproducing device as shown in FIGS. 43 and 44. Referring to FIG. 43, the recording-reproducing device 301 includes a cartridge holder 302 adapted to receive a recording medium cartridge (hereinafter, simply referred to as the cartridge) 401 inserted thereinto, and a chassis 303 attached with the cartridge holder 302. The chassis 303 includes a pair of positioning reference pins 304 adapted to position the cartridge 401, a spindle motor 305, and an optical pickup 306.

Referring to FIG. 44, the cartridge holder 302 is designed to be swingable between a cartridge insertion-withdrawal position where it is slanted at a given inclination angle relative to the chassis and a recording-reproducing position (not shown) where it is superposed on the chassis. The cartridge holder 302 moves to the cartridge insertion-withdrawal position while following the opening of a cabinet lid 311 and moves to the recording-reproducing position while following the closing of the cabinet lid 311.

Referring to FIG. 43, the cartridge 401 is such that a front surface 401a is formed to have an arcuate curve, a first and a second lateral surface 401b, 401c are each formed to have a flat surface and a rear surface 401d is formed to have a more moderately arcuate curve than the front surface 401a. The first lateral surface 401b is formed with an erroneous insertion-preventing portion guide groove 402 adapted to receive an erroneous insertion-preventing portion 307 provided on a first lateral surface 302c of the cartridge holder 302. A position groove 403 is formed at the leading end of the guide groove 402 so as to receive the erroneous insertion-preventing portion 307 fitted thereto when the cartridge 401 is fully received in the cartridge holder 302. The cartridge 401 is provided on its lower surface with a pair of positioning apertures 404 adapted to receive the pair of positioning reference pins 304; a driving-purpose opening portion 405 adapted to receive the spindle motor 304; and with a recording-reproducing-purpose opening portion 406 the optical pickup 306 faces.

As shown in FIG. 43, if the cartridge 401 is inserted into the cartridge holder 302 in a normal posture, the erroneous insertion-preventing portion 307 is introduced into the erroneous insertion-preventing portion guide groove 402 and the erroneous insertion-preventing portion 307 is fitted into the positioning groove 403 so that the cartridge 401 is positioned in the cartridge holder 302.

If the cartridge holder 302 is moved to the recording-reproducing position after the cartridge 401 has been housed in the cartridge holder 302, the pair of positioning reference pins 304 are fitted to the pair of positioning apertures 404 so that the cartridge 401 is positioned relative to the chassis 303. The spindle motor 305 enters the cartridge 401 through the drive-purpose opening portion 405. A hub 408 of an optical disk 407 housed in the cartridge 401 is chucked by the spindle motor 305 and the optical pickup 306 faces a recording surface of the optical disk 407 through the recording-reproducing-purpose opening 406. While the optical disk 407 is rotated by the spindle motor 305, the optical pickup 306 is moved in the radial direction of the optical disk 407 for recording and reproduction. After recording or reproduction is completed, the cartridge holder 302 is returned to the cartridge insertion and withdrawal position and the cartridge 401 is taken out.

If the cartridge 401 is inserted into the cartridge holder 302 in a back-to-front posture or in an upside-down-posture, the erroneous insertion-preventing portions 307 are engaged with the first lateral surface 401b and second lateral surface 401c of the cartridge 401 to prevent the further insertion of the cartridge 401.

Thus, whether or not the cartridge 401 is erroneously inserted is judged at the stage where the cartridge 401 is inserted into the cartridge holder 302 so that the cartridge 401 which otherwise would erroneously be inserted is prevented from being forcibly pressed against the side of the spindle motor 305. (See e.g. Japanese Patent Laid-open No. 2005-322318.)

SUMMARY OF THE INVENTION

The existing recording-reproducing device provided with the cartridge holder described above determines whether or not the cartridge is erroneously inserted at the stage where the cartridge is inserted into the cartridge holder. In the case where the cartridge is erroneously inserted into the cartridge holder, the lower surface of the cartridge will not be pressed against the chassis side unless the further operation is done, that is, the cartridge holder is moved to the recording-reproducing position. Thus, any damage to the optical disk or to the optical pickup due to the forcible pressing of the cartridge can be prevented. However, the recording-reproducing device not provided with the cartridge holder cannot naturally provide an effect of preventing the erroneous insertion of the cartridge holder.

It has recently been desired to develop recording-reproducing devices not using cartridge holders in order to simplify and weight-reduce the structure of the recording-reproducing device. If the cartridge holder is eliminated, the following two points become most problematic.

(1) It is probable that the insertion direction of the cartridge is erroneously recognized as the right one although it is the wrong one and the cartridge holder is strongly pressed against the chassis side to damage an optical disk or an optical pickup.

(2) The exiting recording-reproducing device using the cartridge holder is such that the cartridge can easily be taken out from the chassis by moving the cartridge holder to the recording-reproducing position. However, the recording-reproducing device not using the cartridge holder is such that the cartridge must be taken out from the chassis by picking it up one by one.

It is desirable to solve the existing problem (1) described above by effectively utilizing the curved shape of a cartridge and provide a recording-reproducing device not using a cartridge holder that can easily recognize erroneous insertion of the cartridge to prevent the cartridge that has erroneously been inserted from being pressed against the chassis side.

According to an embodiment of the present invention, there is provided a recording-reproducing device in which a recording medium cartridge is directly inserted into a mechanical deck not through a cartridge holder and placed on a chassis of the mechanical deck for recording and/or reproduction.

In this device, the mechanical deck includes an erroneous insertion-preventing portion which conforms to the curved shape of a front surface of the recording medium cartridge in the insertion direction thereof at the time of the insertion in a normal posture.

The front surface of the recording medium cartridge is pressed against the erroneous insertion-preventing portion to temporarily position the recording medium cartridge. Thereafter, the recording medium cartridge is depressed to fit a positioning reference pin provided on the chassis into a positioning hole provided in the recording medium cartridge for final positioning.

DETAILED DESCRIPTION OF THE PREFERRED EMBODIMENTS

Embodiments of the present invention will hereinafter be described in the order of (1) the schematic configuration of the entire recording-reproducing device, (2) the configuration of a cartridge, (3) the configuration of an erroneous insertion-preventing portion, (4) the configurations of a cabinet lid and a cartridge ejection mechanism, (5) the configuration of a spindle motor, (6) the configuration of a thread motor, (7) the configuration of a transmission gear group (gear train), and (8) function and effect.

(1) Schematic Configuration of the Entire Recording-Reproducing Device

Figure 1:
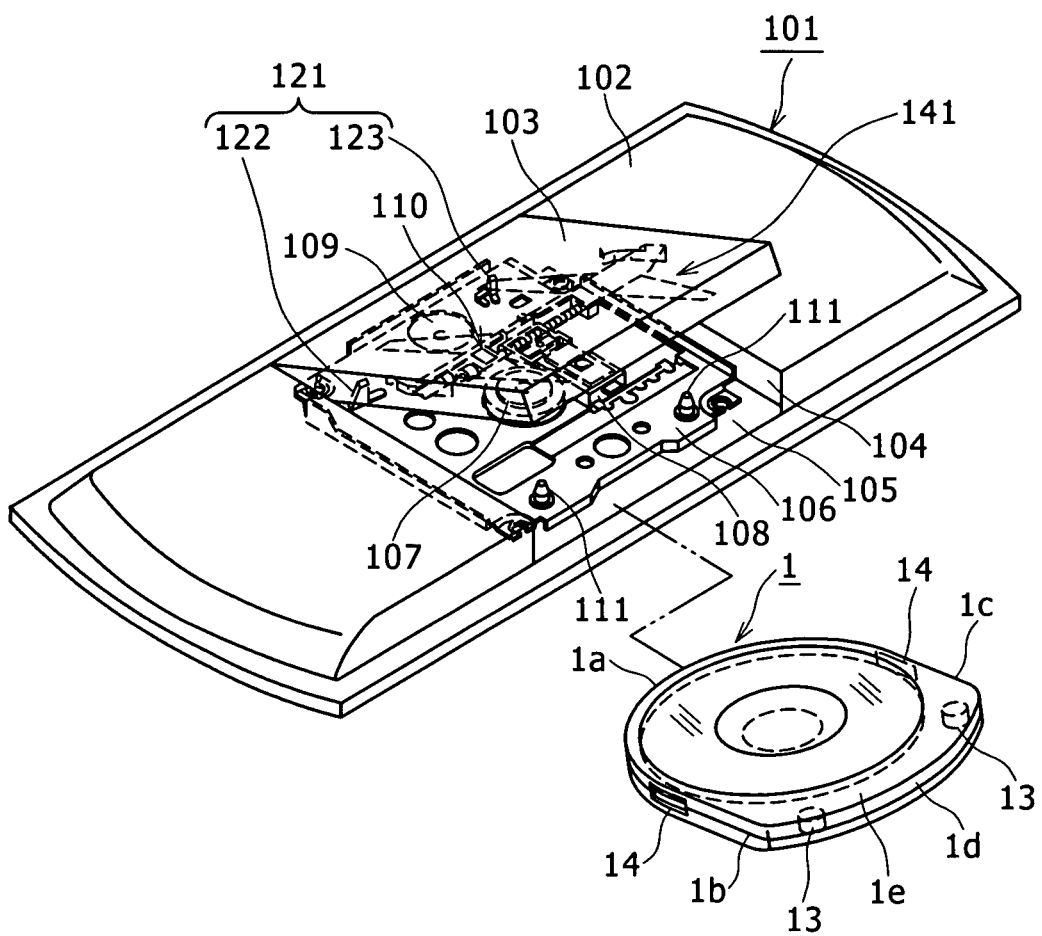
FIG. 1 is a perspective view of a recording-reproducing device with its cabinet lid opened.
Figure 2:
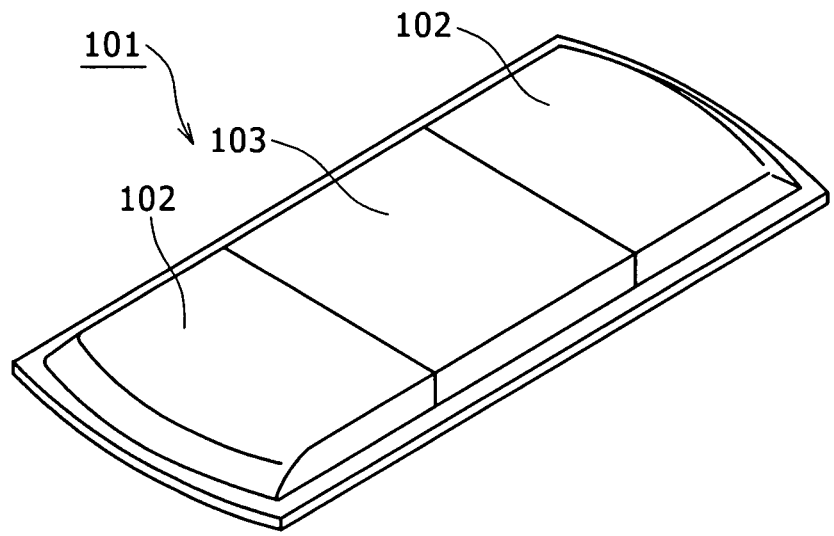
FIG. 2 is a perspective view of the recording-reproducing device with the cabinet lid closed.
Figure 3:
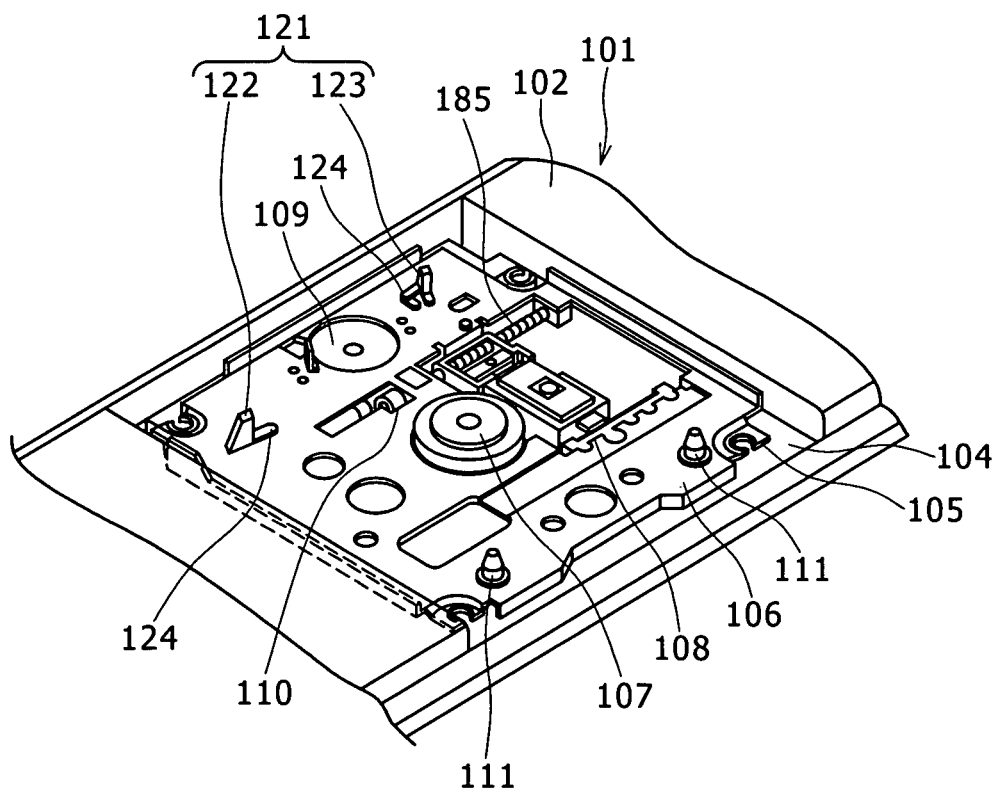
FIG. 3 is a partial perspective view of the recording-reproducing device with the cabinet lid removed.
Figure 4:
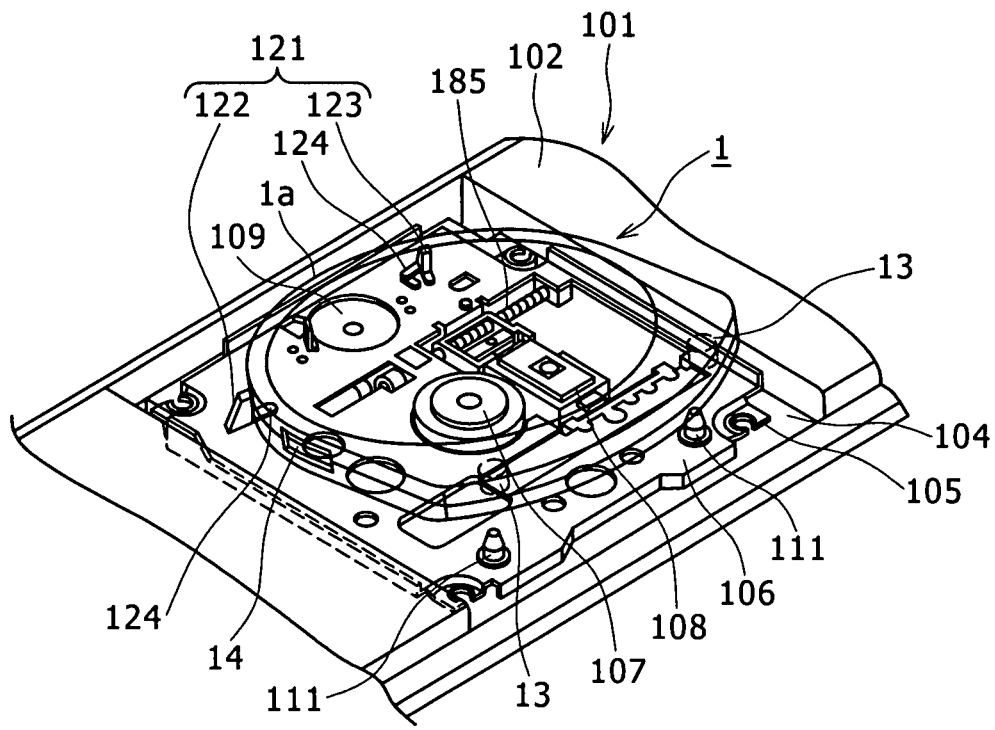
FIG. 4 is a partial perspective view of the recording-reproducing device, in which the front surface side of a cartridge is slanted downward so as to come into contact with an erroneous insertion-preventing portion.
Figure 5:
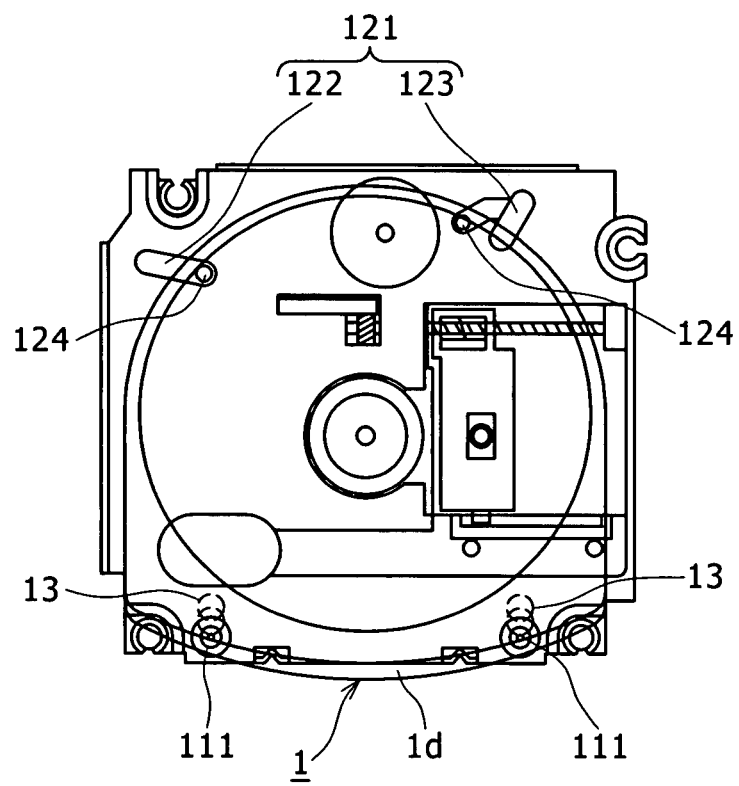
FIG. 5 is a plan view of FIG. 4.
Figure 6:
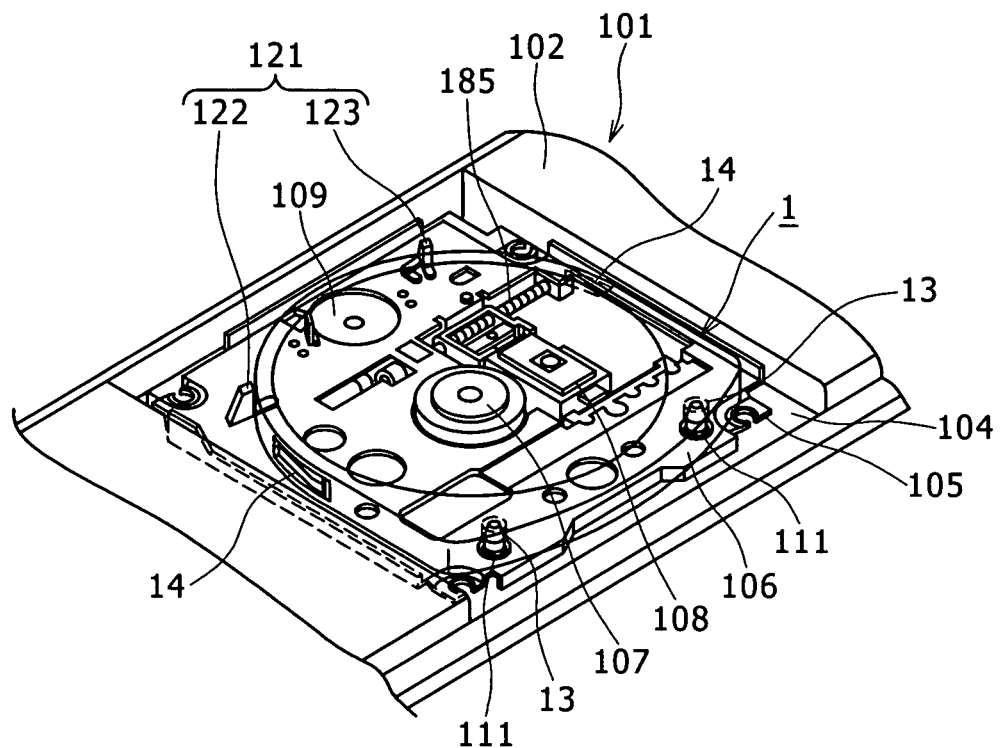
FIG. 6 is a partial perspective view of the recording-reproducing device to which the cartridge has been loaded.
Figure 7:
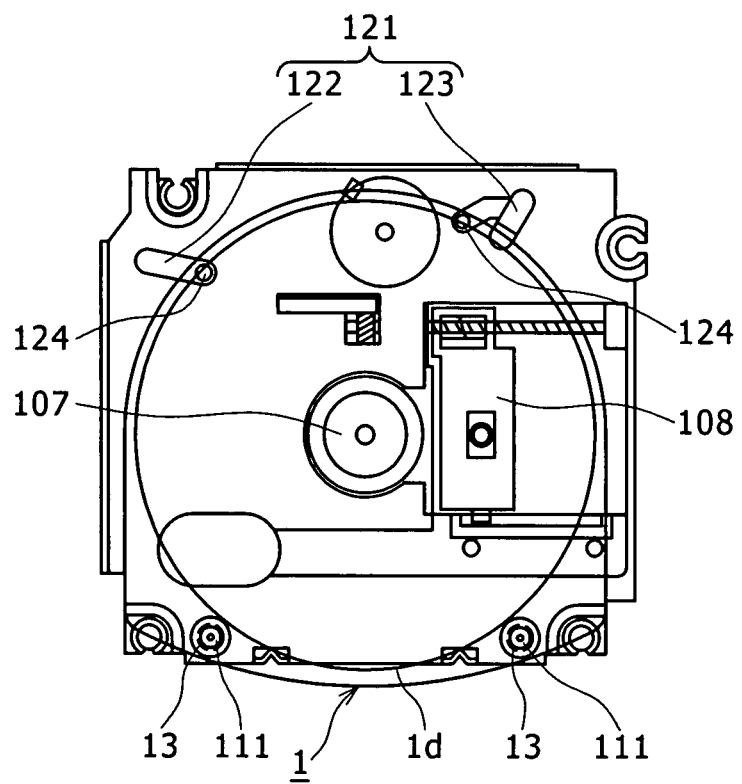
FIG. 7 is a plan view of FIG. 6.
Figure 8:
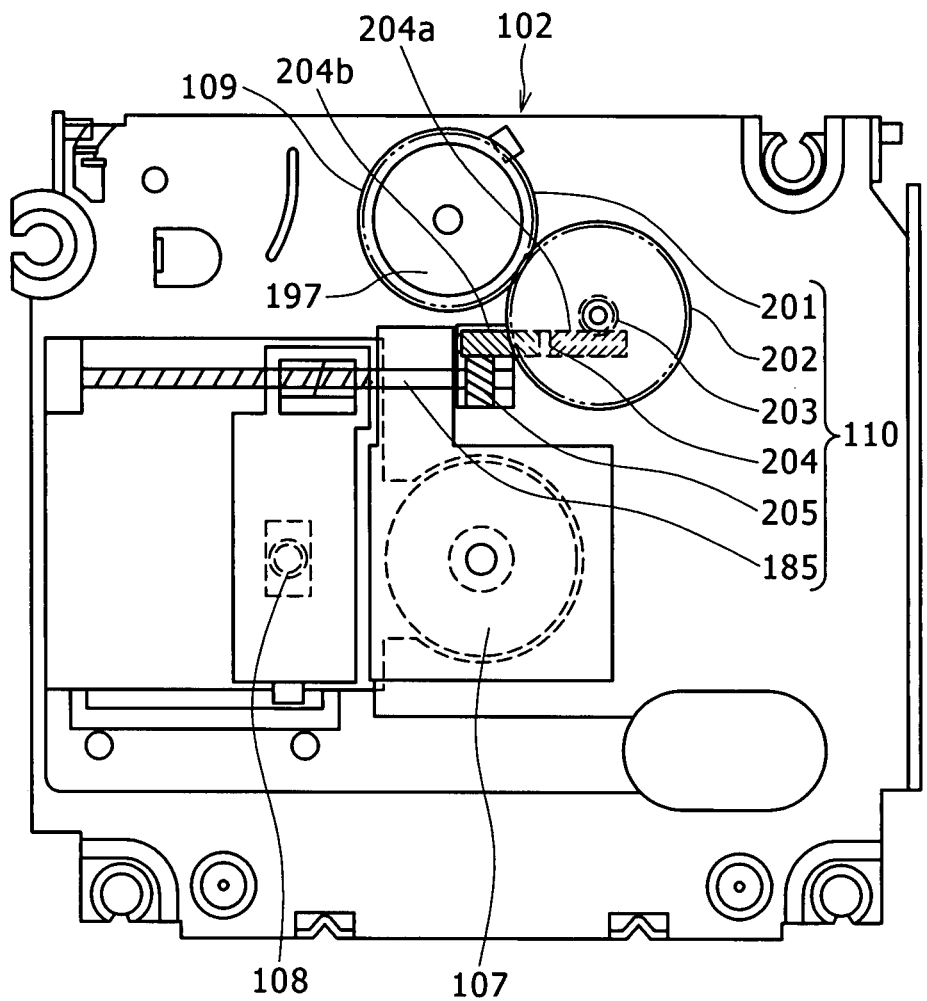
FIG. 8 is a bottom view of a mechanical deck.

FIG. 1 is a perspective view of a recording-reproducing device with its cabinet lid opened. FIG. 2 is a perspective view of the recording-reproducing device with the cabinet lid closed. FIG. 3 is a partial perspective view of the recording-reproducing device with the cabinet lid removed. FIG. 4 is a partial perspective view of the recording-reproducing device, in which the front surface side of a cartridge is slanted downward so as to come into contact with an erroneous insertion-preventing portion. FIG. 5 is a plan view of FIG. 4. FIG. 6 is a partial perspective view of the recording-reproducing device to which the cartridge has been loaded. FIG. 7 is a plan view of FIG. 6. FIG. 8 is a bottom view of a mechanical deck.

Referring to FIG. 1, the recording-reproducing device 101 includes a cabinet 102, a cabinet lid 103 attached in an openable and closable manner, and a mechanical deck 105 assembled inside a mechanical deck storage portion 104 opened and closed by the cabinet lid 103.

The mechanical deck 105 is provided with a spindle motor 107 at the almost central portion, on the upper side, of the chassis 106 and includes an optical pickup 108 located on the side of the spindle motor 107; and a thread motor 109 and a transfer gear train 110 adapted to move the optical pickup 108. The optical pickup 108 can perform not only reproduction but also recording.

The chassis 106 includes a pair of left and right cartridge positioning reference pins 111 and an erroneous insertion-preventing portion 121. The cartridge positioning reference pins 111 are located on its rear end (an end where a rear surface 1d of the inserted cartridge 1 is located, the lower right side portion in FIG. 1). The erroneous insertion-preventing portion 121 is located at its front end (an end where a front surface 1a of the inserted cartridge 1 is located, the upper left side portion in FIG. 1). The cartridge positioning reference pins 111 are fitted into a pair of left and right positioning reference holes 13 provided on an lower surface 1e of the cartridge 1. The front surface 1a of the cartridge 1 is pressed against the erroneous insertion-preventing portion 121.

Referring to FIGS. 4 and 5, the front surface 1a of the cartridge 1 is directed downward to slant the cartridge 1 at a given angle and slightly pressed against the erroneous insertion-preventing portion 121. Thereafter, the cartridge 1 is slightly pressed against the side of the chassis 106 while it is slightly pulled toward the rear surface 1d. Referring to FIGS. 6 and 7, consequently, the positioning reference pins 111 provided on the chassis 106 are fitted to the pair of left and right positioning holes 13 provided on the lower surface of the cartridge 1. Thus, a disklike recording medium housed in the cartridge 1 is chucked by the spindle motor 107.

When the cabinet lid 103 is closed, a cartridge ejection mechanism 141 provided on the inner surface of the cabinet lid 103 is engaged with the cartridge 1. With the cabinet lid 103 remaining closed, data is recorded to or reproduced from the disklike recording medium by the optical pickup 108 while rotating the medium by the spindle motor 107.

When the cabinet lid 103 is opened after completion of the recording or reproduction, the cartridge 1 is lifted by the cartridge ejection mechanism 141 and taken out from the mechanical deck storage portion 104.

(2) Configuration of the Cartridge

Figure 9:
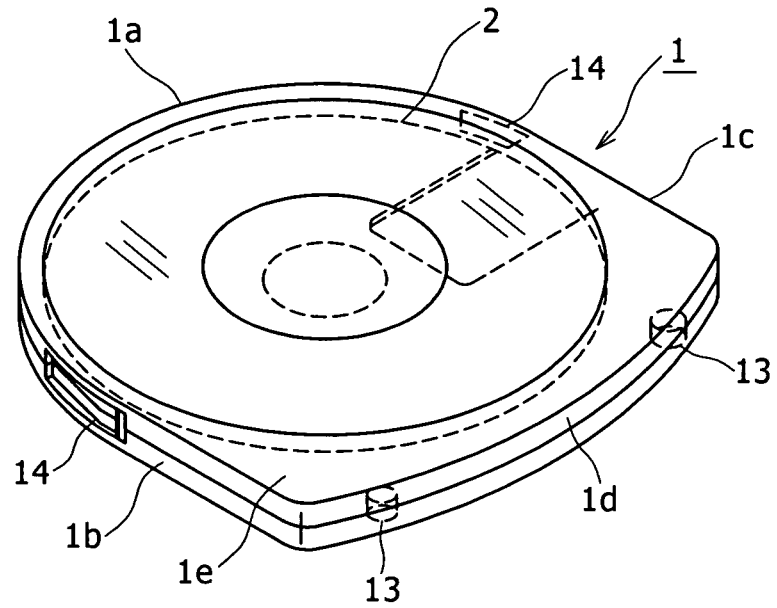
FIG. 9 is a perspective view of the cartridge.
Figure 10:
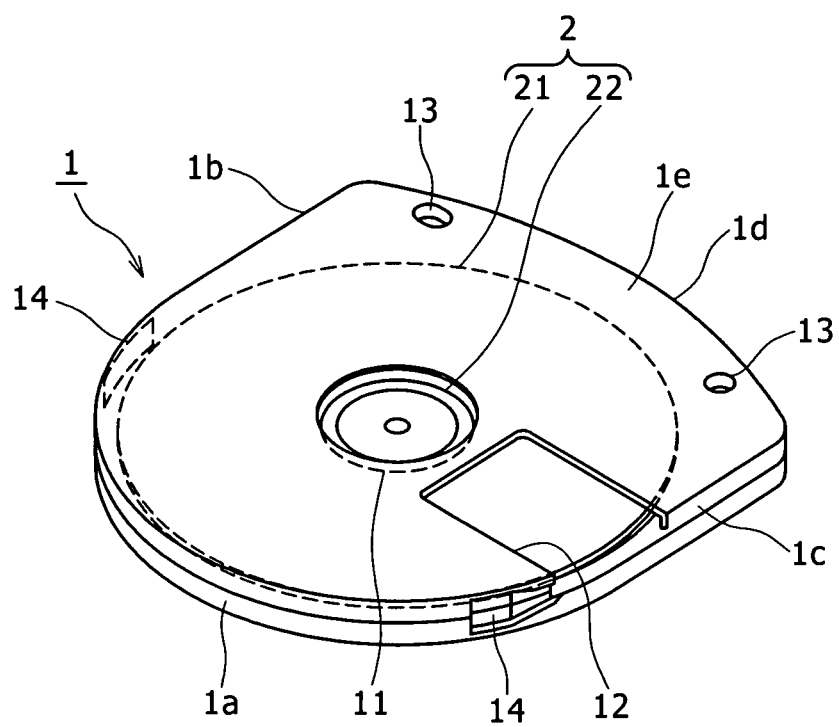
FIG. 10 is a perspective view of the cartridge as viewed from the bottom thereof.

FIG. 9 is a perspective view of the cartridge 1 as viewed from the upper half side and FIG. 10 is a perspective view of the cartridge 1 as viewed from the lower half side.

The disklike recording medium 2 is rotatably housed in the cartridge 1. The disklike recording medium 2 is configured to have a chucking hub 22 attached to the central portion of an optical disk 21 in which game software or the like is recorded. The chucking hub 22 is formed of a magnetic metal such as stainless steel attracted by a magnet.

The cartridge 1 is formed as below. The front surface 1a is formed in an arcuate curve having almost the same curvature radius as that of the optical disk 21. The left and right lateral surfaces 1b, 1c continuous with the front surface 1a are formed in respective flat surfaces parallel to each other. The rear surface 1d opposite to the front surface 1a is formed in an arcuate curve having a curvature radius greater than that of the front surface 1a continuous to the left and right, i.e., the first and second, lateral surfaces 1b, 1c.

The lower surface 1e of the cartridge 1 is formed at its central portion with a drive-purpose opening portion 11 through which the hub 22 of the disklike recording medium 2 is exposed to the outside. A recording-reproducing-purpose opening portion 12 is provided to extend from the vicinity of the drive-purpose opening portion 11 to the second lateral surface 1c so as to expose the information-recording surface of an optical disk 21 of the disklike recording medium 2 to the outside therethrough. The lower surface 1e of the cartridge 1 is provided with a pair of positioning holes 13 in the lower surface 1e of the cartridge 1 and close to the rear surface 1d.

The first lateral surface 1b and second lateral surface 1c of the cartridge 1 are each formed with a retaining member engagement groove 14. When the cabinet lid 103 is closed, an almost-V-shaped engaging portion 142 formed at the end of the cartridge ejection mechanism 141 provided on the cabinet lid 103 described next is fitted into and engaged with the retaining member engagement groove 14. In addition, when the cabinet lid 103 is opened, the cartridge 1 is lifted on the chassis 106 together with the cabinet lid 103.

(3) Configuration of the Erroneous Insertion Preventing Portion

The erroneous insertion-preventing portion 121 prevents erroneous insertion of the cartridge 1 and permits the cartridge 1 to be loaded to the mechanical deck 105 only when the cartridge 1 is inserted thereinto in a normal posture.

The erroneous insertion-preventing portion 121 according to a first embodiment shown in FIGS. 1 through 14 is formed by disposing a pair of left and right positioning projections 122, 123 at respective positions following (conforming to) the shape of the front surface 1a of the recording medium cartridge 1. The positioning projections 122, 123 are adapted to temporarily position the front surface 1a of the cartridge 1.

The first and second positioning projections 122, 123 are formed integrally with the chassis 106 by outsert molding. A placement reference surface 124 is provided at a base portion of each of the first and second positioning projections 122, 123 so as to position the cartridge 1 in the height direction thereof.

Figure 11:
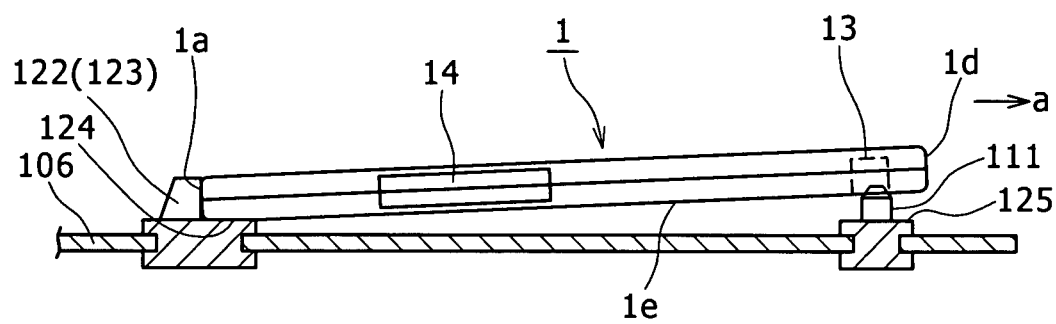
FIG. 11 is a lateral view illustrates a state where the front surface of the cartridge is brought into contact with the erroneous insertion-preventing portion for temporary positioning.

If the cartridge 1 is inserted in a normal posture, the front surface 1a of the cartridge 1 comes into contact with the first and second positioning projections 122, 123 to temporarily position the cartridge 1. As shown in FIG. 11, the tip of the positioning reference pin 111 comes into contact with the lip or circumferential edge portion of the positioning hole 13 of the cartridge 1.

Figure 12:
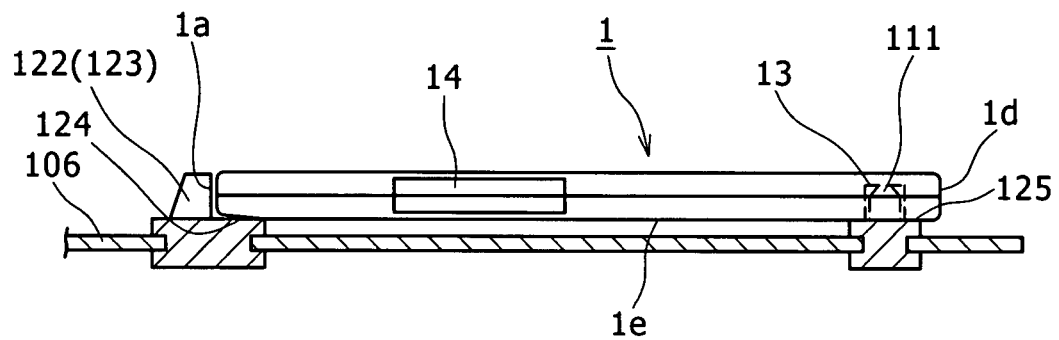
FIG. 12 is a lateral view illustrating a state where reference pins are inserted into reference holes to finally position the cartridge.

In this state, the cartridge 1 is slightly pulled toward the rear surface 1d (in the direction of arrow "a" in FIG. 11). As shown in FIG. 12, this allows the positioning reference pins 111 to be fitted into the positioning holes 13, thereby positioning the cartridge 1 in the back and forth direction and in the left and right direction. In addition, the cartridge 1 is positioned in the height direction by the placement reference surfaces 124 provided on the base portions of the first and second positioning projections 122, 123 and by placement reference surfaces 125 provided on the base portions of the positioning reference pins 111.

Figure 13:
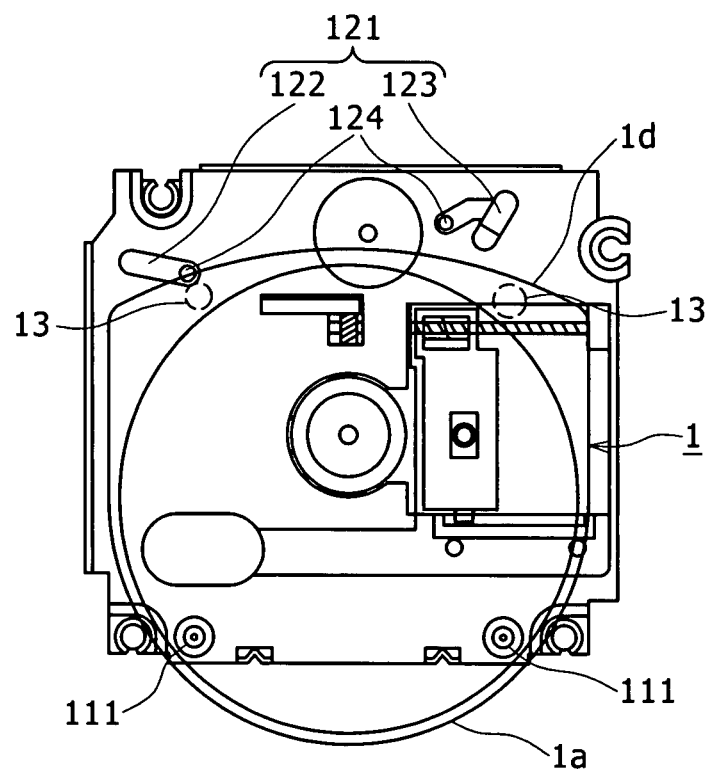
FIG. 13 is a plan view illustrating a state where erroneous loading is prevented by the erroneous insertion-preventing portion.
Figure 14:
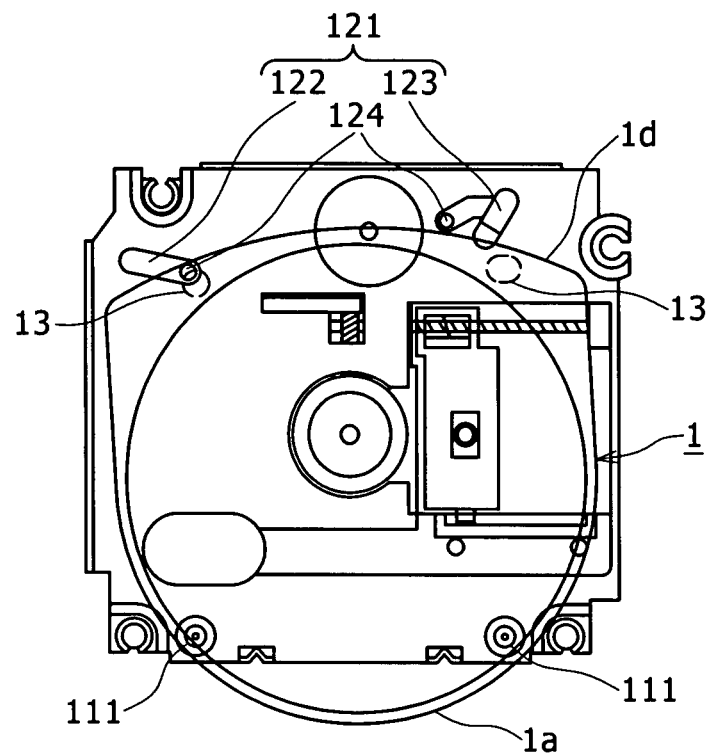
FIG. 14 is a plan view illustrating a state where erroneous loading is prevented by the erroneous insertion-preventing portion.
Figure 15:
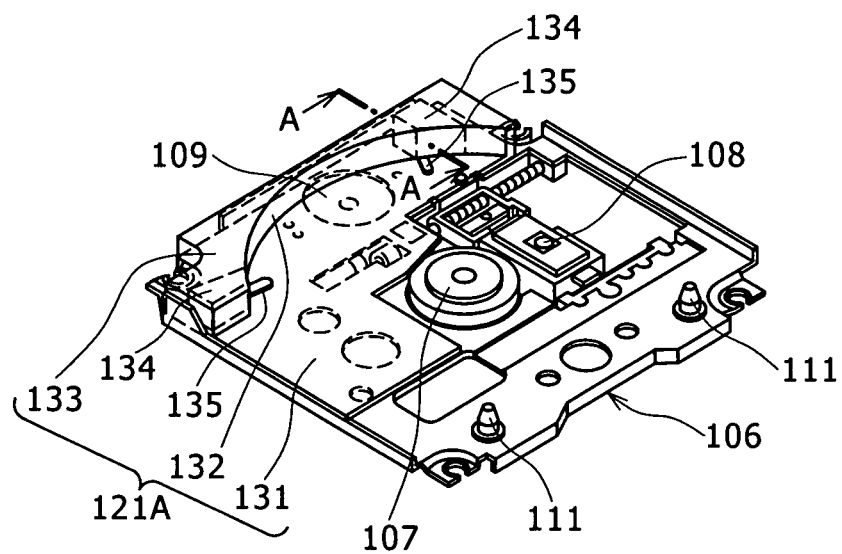
FIG. 15 is a perspective view of the erroneous insertion-preventing portion according to another embodiment.
Figure 16:
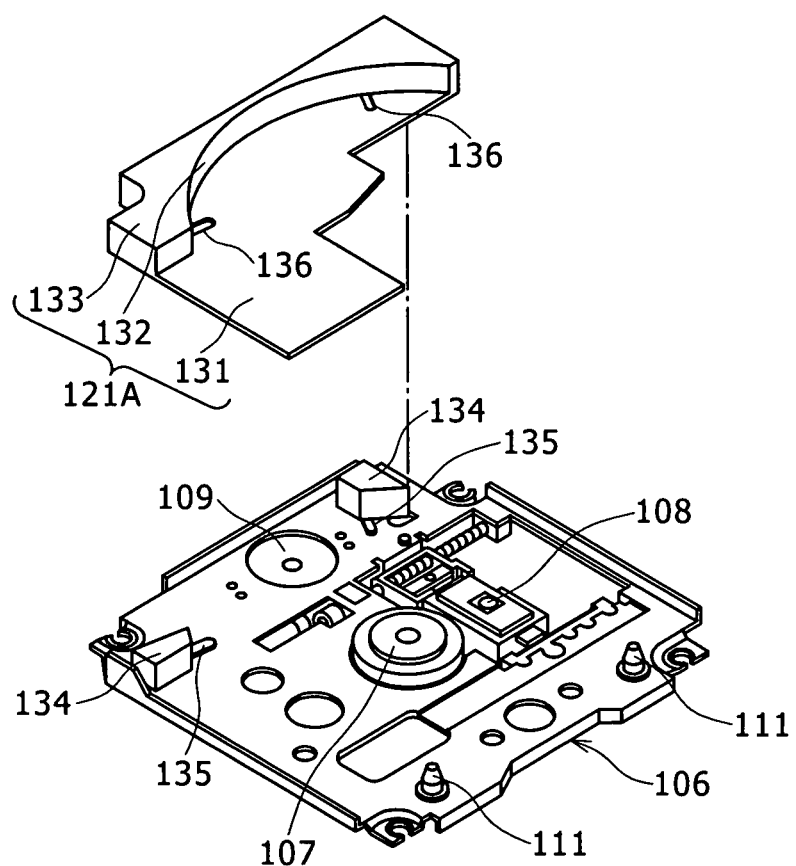
FIG. 16 is a perspective view illustrating a state where the erroneous insertion-preventing portion is removed.

In contrast to the case where the posture of the cartridge 1 is normal as described above, in the case where the posture of the cartridge 1 is not normal, for example, if the cartridge 1 is about to be loaded back to front, only the first positioning projection 122 comes into contact with the rear surface 1d of the cartridge 1 as shown in FIG. 13. If the rear surface 1d of the cartridge 1 is intended to be brought into contact with both the first and second positioning projections 122, 123, the cartridge 1 turns obliquely sideways as shown in FIG. 14 to suggest the wrong loading direction.

FIGS. 15 through 19 illustrate an erroneous insertion-preventing portion 121A according to a second embodiment. In the first embodiment described above, the erroneous insertion-preventing portion 121 is configured to include the first and second, two, positioning projections 122, 123. However, in the second embodiment, the erroneous insertion-preventing portion 121A is configured to include a base plate 131 superposed on the chassis 106; and a wall-like positioning projection 133 provided to extend upright and to have a curved portion 132 following (conforming to) the shape of the front surface 1a of the cartridge 1. The base plate 131 is attached to the chassis 106 by being superposed on and bonded to the chassis 106. The wall-like positioning projection 133 is formed hollow.

Figure 17:
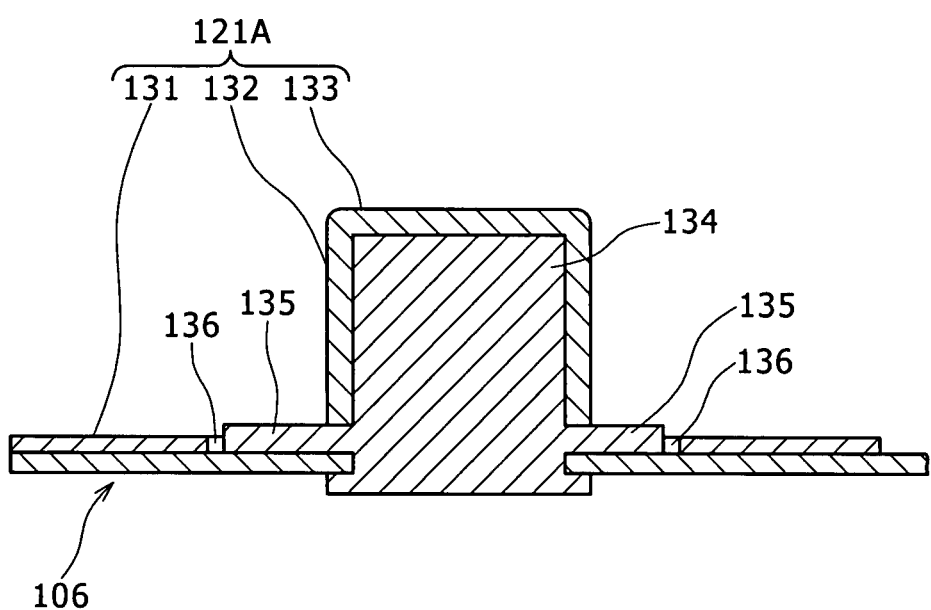
FIG. 17 is a cross-sectional view taken along line A-A of FIG. 15.

Referring to FIG. 17, a plurality of support projections 134 provided on the chassis 106 are fitted to the hollow inside portion of the positioning projections 133 to support from the rear side the deformable portions of the curved portion 132 at both ends thereof. Thus, the support projections 134 prevent the deformation of the curved portion 132 when the recording medium cartridge 1 is pressed against the curved portion 132.

A placement reference surface 135 is formed integrally with the base portion of the support projection 134 so as to position the height position of the cartridge 1. The placement reference surface 135 projects from the base plate 131 upward through a notched portion 136 provided in the base plate 131.

Figure 18:
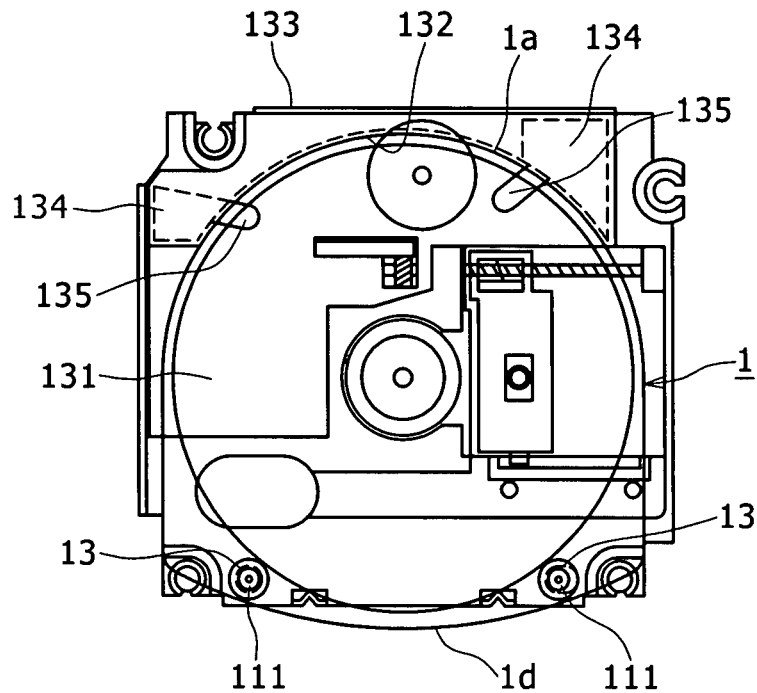
FIG. 18 is a plan view illustrating a state where the cartridge is loaded.

As described above, the erroneous insertion-preventing portion 121A of the second embodiment is configured such that the front surface 1a of the cartridge 1 is abutted against the curved surface 132 formed to follow (conform to) the shape of the front surface 1a. Thus, as shown in FIG. 18, when the cartridge 1 is inserted in a normal posture to abut the front surface 1a against the curved portion 132, both are brought into close contact with each other to temporarily position the cartridge 1.

Figure 19:
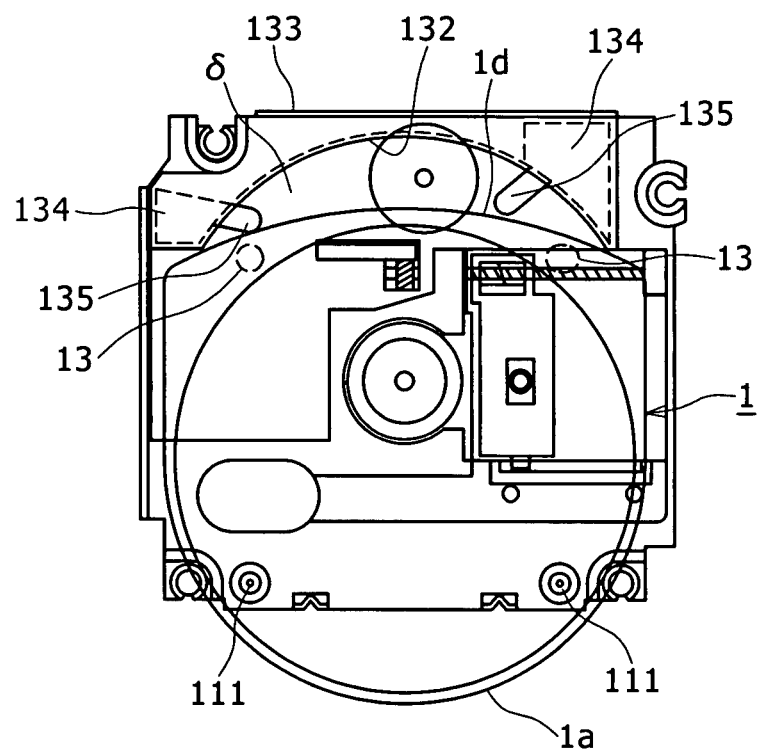
FIG. 19 is a plan view illustrating a state where the cartridge is erroneously loaded.

If the cartridge 1 is about to be loaded back to front, a large gap δ is defined between the curved portion 132 and the rear surface 1d of the cartridge 1 as shown in FIG. 19, which makes the wrong loading direction clear. Since the other configurations, functions and effects are the same as those of the first embodiment, duplicate explanations are omitted. Incidentally, the second embodiment is configured such that the erroneous insertion-preventing portion 121A is formed like the so-called brick-pack and attached to the chassis 106. However, the erroneous insertion-preventing portion 121A may be formed integrally with the chassis 106 by outsert molding.

(4) Configuration of Cabinet Lid and Cartridge Ejection Mechanism

As shown in FIG. 1, the cabinet lid 103 is attached to the cabinet 102 so as to be turnable in an openable and closable manner and closes and opens the mechanical deck storage portion 104 housing the mechanical deck 105 therein. In the lid-closed state shown in FIG. 2, the cabinet lid 103 is locked by a lock mechanism not shown to maintain such a state.

Figure 20:
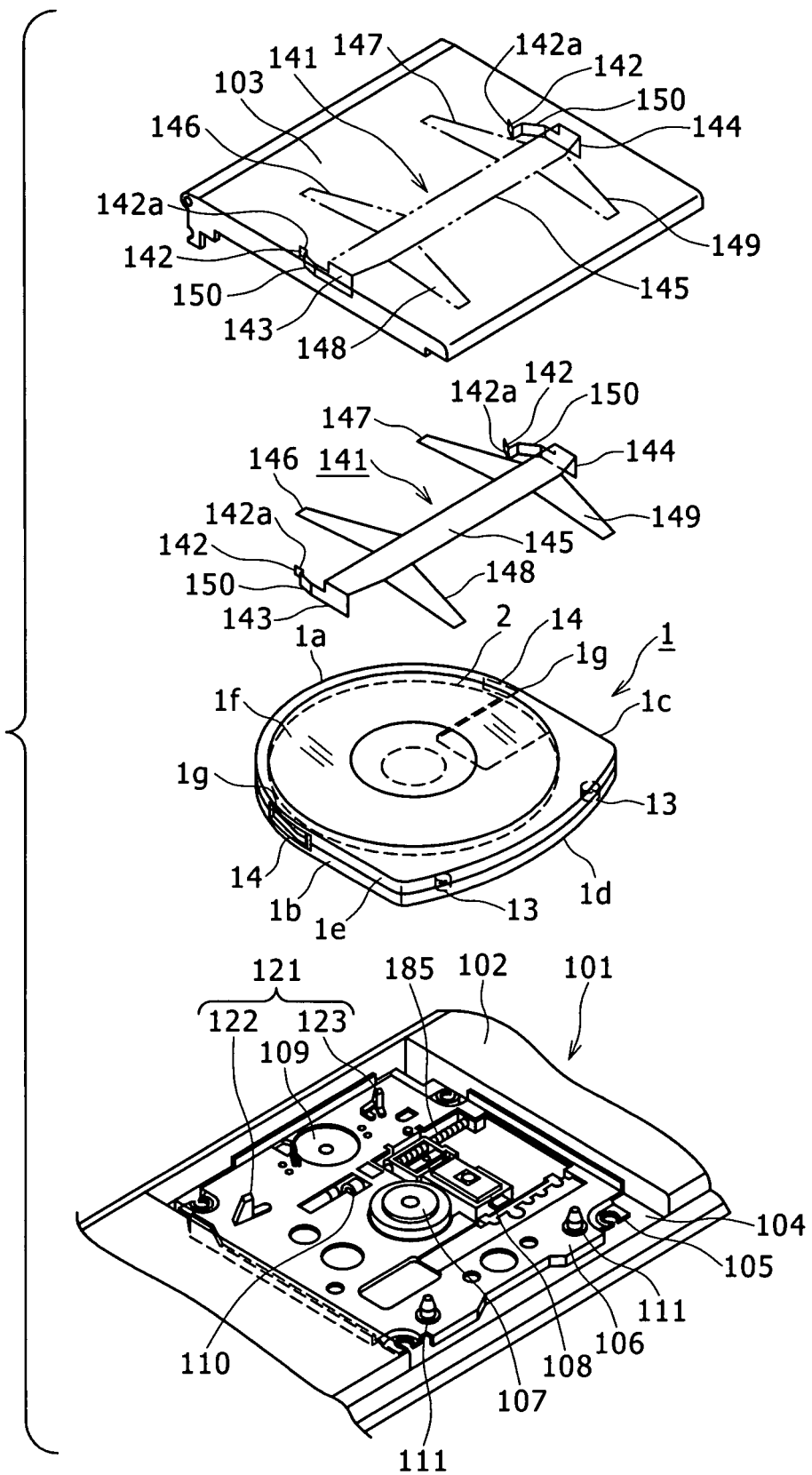
FIG. 20 is a perspective view of a cabinet lid, a cartridge ejection mechanism, etc.

Referring to FIG. 20, the cartridge ejection mechanism 141 is provided on the inner surface of the cabinet lid 103. When the cabinet lid 103 that has been closed is opened, the cartridge ejection mechanism 141 allows the cartridge 1 to follow the cabinet lid 103 and be lifted on the chassis 106, thereby making it easy to take out the cartridge 1.

The cartridge ejection mechanism 141 includes first and second cartridge-retaining portions 143, 144; a base portion 145; first and second cartridge-pressing portions 146, 147; and third and fourth cartridge-pressing portions 148, 149. Each of the first and second cartridge-retaining portions 143, 144 has an engaging portion 142 at its end which is engaged with a corresponding one of the retaining member-engaging grooves 14 provided in the first and second lateral surfaces 1b, 1c of the cartridge 1 loaded to the mechanical deck 105 when the cabinet lid 103 is closed. The base portion 145 is provided with first and second cartridge-retaining portions 143, 144 at both longitudinal end portions thereof. The first and second cartridge-pressing portions 146, 147 are formed to project from one lateral portion of the base portion 145 and have leading end portions which press the upper surface 1f of the cartridge 1 on the side of the front surface 1a to press the front surface side of the cartridge 1 against the chassis 106 when cabinet lid 103 is closed. The third and fourth cartridge-pressing portions 148, 149 are formed to project from the other lateral portion of the base portion 145 and have leading end portions which press the upper surface 1f of the cartridge 1 on the side of the rear surface 1d to press the rear surface side of the cartridge 1 against the chassis 106 when the cabinet lid 103 is closed.

The engaging portion 142 is formed by bending, into an almost-V-shape, the tip of an elastic arm portion 150 included in each of the first and second cartridge-retaining portions 143, 144.

The arm portion 150 is torsional. When the cabinet lid 103 is closed, a ridge 142a of the almost-V-shaped engaging portion 142 comes into contact with and moves along the circumferential edge portion 1g of the upper surface 1f of the cartridge 1. When the engaging portion 142 reaches the retaining member-engaging groove 14, it moves so as to be restored by the elasticity of the arm portion 150 and comes into engagement with the retaining member-engaging groove 14.

The cartridge ejection mechanism 141 is formed by punching a plate spring material into a given shape and then bending it into a given shape. The cartridge ejection mechanism 141 is attached to the inner surface of the cabinet lid 103.

Figure 21:
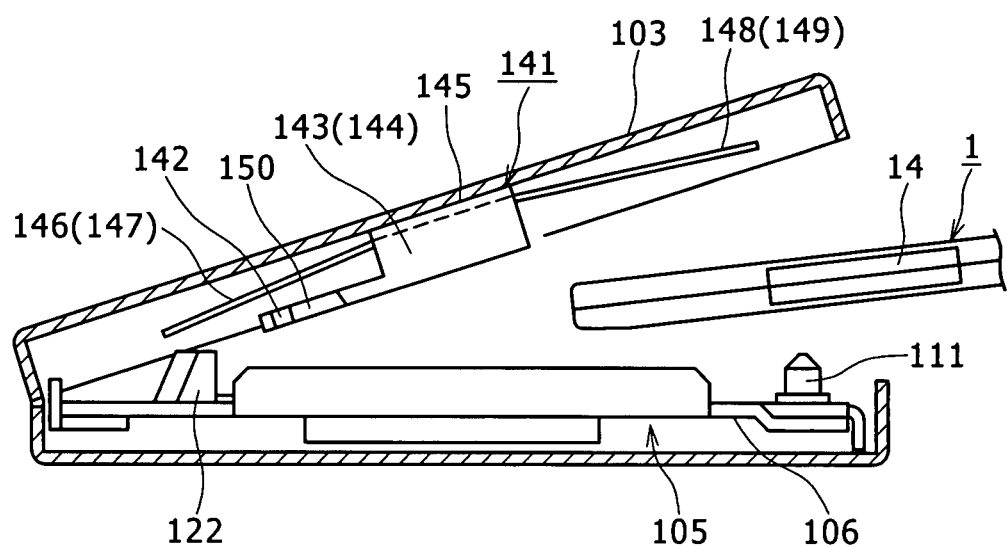
FIG. 21 is a cross-sectional view of the recording-reproducing device with the cabinet lid opened.
Figure 22:
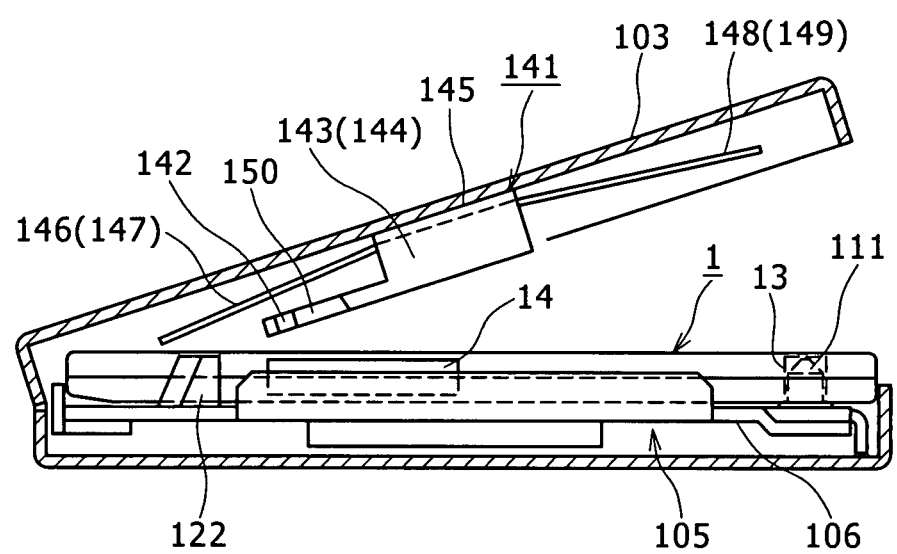
FIG. 22 is a cross-sectional view of the recording-reproducing device with the cartridge loaded.

The cartridge ejection mechanism 141 is configured as described above. The cartridge 1 is loaded to the mechanical deck 105 and the cabinet lid 103 is closed as shown in FIGS. 21 and 22. In this state, the engaging portions 142 of the first and second cartridge-retaining portions 143, 144 at the ends thereof are each engaged with a corresponding one of the retaining member-engaging grooves 14 provided in the first and second lateral surfaces 1b, 1c of the cartridge 1. In addition, the ends of the first through fourth cartridge pressing portions 146 through 149 press the cartridge 1 against the chassis 106 of the mechanical deck 105. Recording or reproduction is performed in this state.

Figure 25:
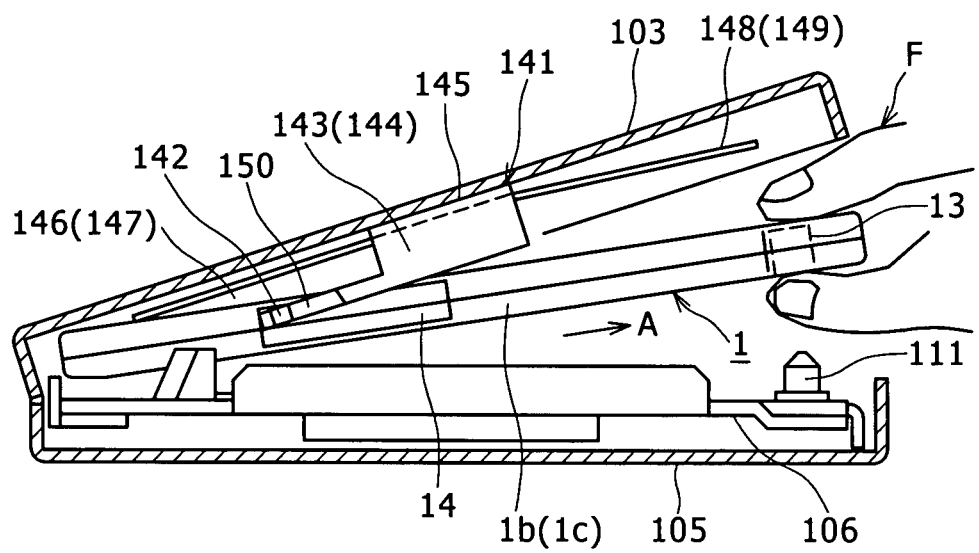
FIG. 25 is a cross-sectional view illustrating a state where a cabinet lid is opened to lift the cartridge.
Figure 26:
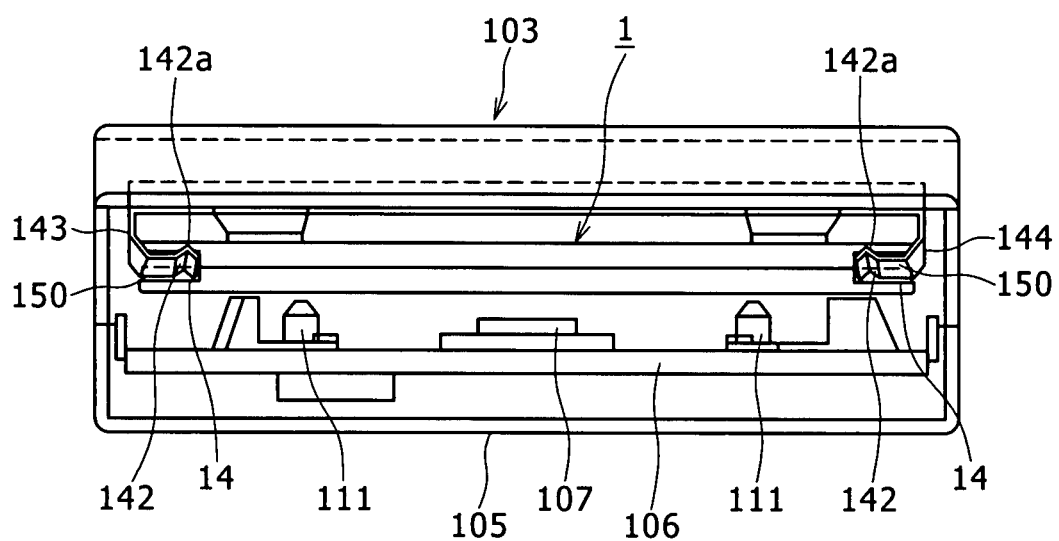
FIG. 26 is a front view illustrating a state where the cabinet lid is opened to lift the cartridge.
Figure 27:
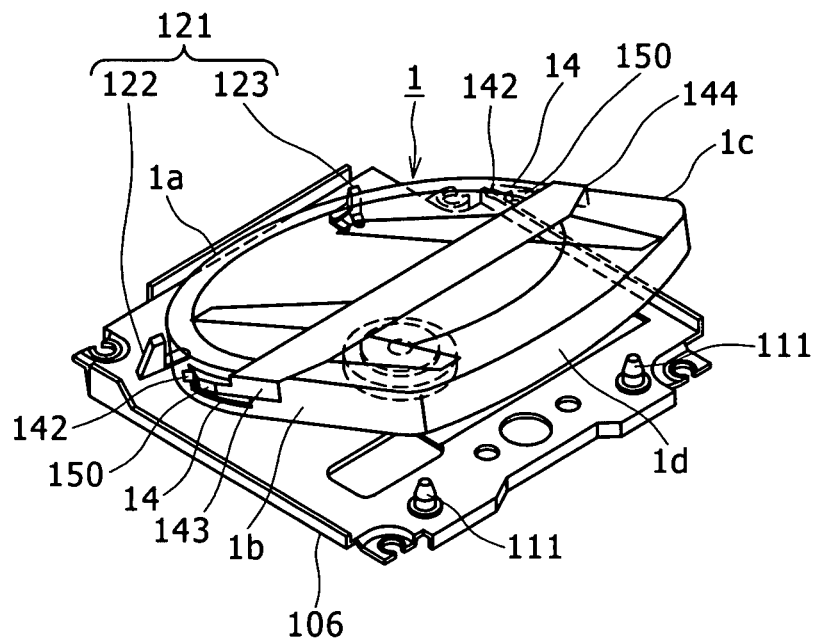
FIG. 27 is a perspective view illustrating operation of the cartridge ejection mechanism in the state where the cabinet lid is opened.
Figure 28:
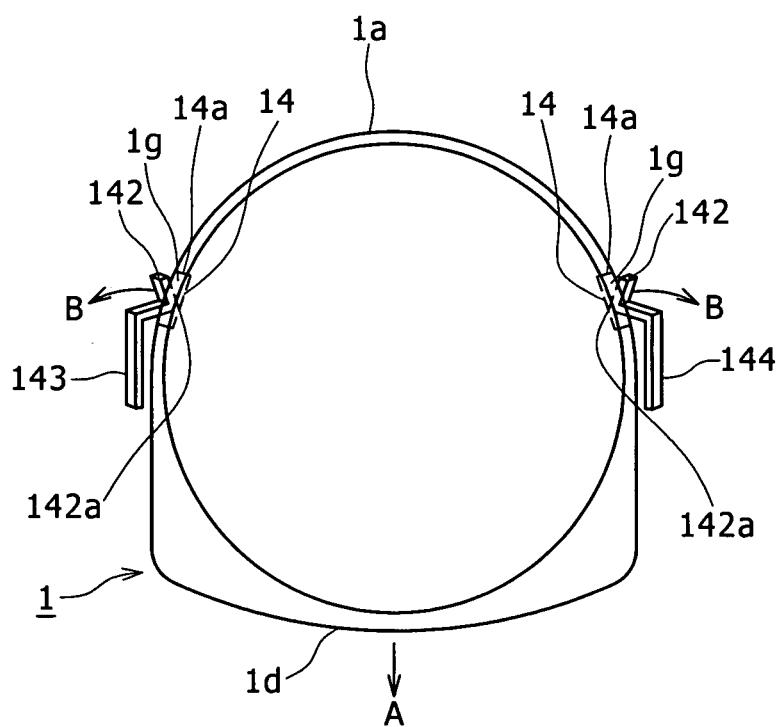
FIG. 28 is a plan view illustrating operation of the cartridge ejection mechanism encountered when the cartridge is extracted.

Referring to FIGS. 25 through 27, when the cabinet lid 103 is opened after the completion of the recording or reproduction, the cartridge is lifted from the chassis 106 of the mechanical deck 105 together with the cabinet lid 103 by the first and second cartridge-retaining portions 143, 144 in which the engaging portions 142 are each engaged with a corresponding one of the retaining member-engaging grooves 14 provided in the first and second lateral surfaces 1b, 1c of the cartridge 1.

The retaining member-engaging grooves 14 are each engaged with a corresponding one of the engaging portions 142 of the first and second cartridge-retaining portions 143, 144 at a position closer to the front surface 1a of the cartridge 1 than to the rear surface 1d thereof. Because of such a weight balance, the cartridge 1 turns clockwise in FIG. 25 around the engaging portion 142 of each of the cartridge-retaining portions 143, 144 so as to lower the side of the front surface 1a, resulting in a state where the rear surface 1d of the cartridge 1 is spaced apart from the cabinet lid 103. Accordingly, if the cartridge 1 is pulled in the direction of arrow A with the side of the rear surface 1d of the cartridge 1 held with one's fingertips F, one end surface 14a of the retaining member-engaging groove 14 comes into contact with and moves the engaging portion 142 in the direction of arrow B. Thus, the engaging portion 142 is extracted from the retaining member-engaging groove 14 so that the cartridge 1 is brought into a free state and extracted from the mechanical deck 105. Incidentally, the embodiment described above is configured as below. The pair of engaging portions 142 are each provided for a corresponding one of the first and second cartridge-retaining portions 143, 144. The engaging portions 142 are each engaged with a corresponding one of the retaining member-engaging grooves 14 provided in the first and second lateral surfaces 1b, 1c of the cartridge 1. Alternatively, the first and second cartridge-retaining portions 143, 144 may be each provided with a plurality of paired engaging portions 142, which are engaged with the retaining member-engaging groove 14 provided in each of the first and second lateral surfaces 1b, 1c of the cartridge 1. The embodiment described above is configured such that the engaging portions 142 are each engaged with a corresponding one of the retaining member-engaging grooves 14 provided in the first and second lateral surfaces 1b, 1c of the cartridge 1. However, the ends of the engaging portions 142 may be engaged with the lower surface of the cartridge 1.

(5) Configuration of the Spindle Motor

Figure 29:
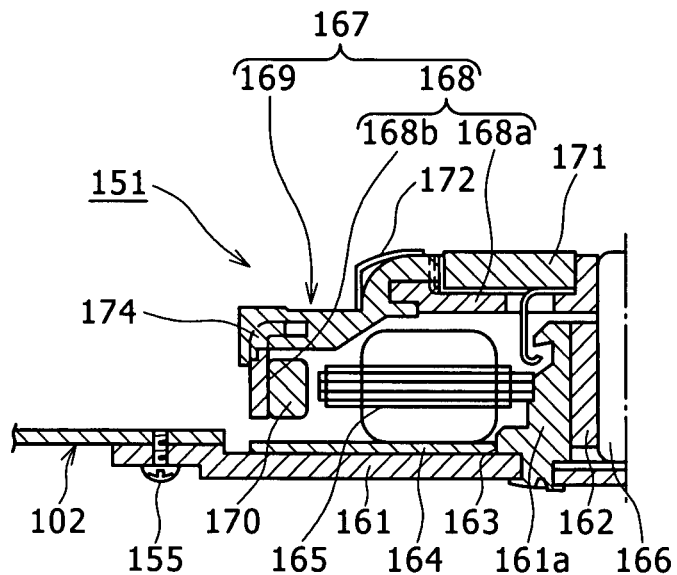
FIG. 29 is a cross-sectional view of a spindle motor according to a first embodiment.

Referring to FIG. 29, the spindle motor 151 includes a cylindrical bearing portion 161a provided on a stator basal plate 161; a bearing 162 attached to the inner circumferential portion of the bearing portion 161a; a wiring board 164 placed on the stator basal plate 161 with the bearing portion 161a inserted in a central hole 163; a core coil 165 attached to the outer circumferential portion of the bearing portion 161a; a rotor assembly 167 rotatably attached to the bearing 162 with the end of the rotational shaft 166 inserted into the bearing 162. The rotor assembly 167 includes a rotor 168 and a disk table 169 made of a synthetic resin attached to the rotor 168 by outsert molding.

A rotor magnet 170 paired with the core coil 165 is attached to the inner surface of the rotor 168. A chucking magnet 171 and a centering spring 172 are attached to the disk table 169. The chucking magnet 171 is adapted to magnetically chuck the hub 22 of the disklike recording medium 2. The centering spring 172 is adapted to center the recording medium 2.

Figure 30:
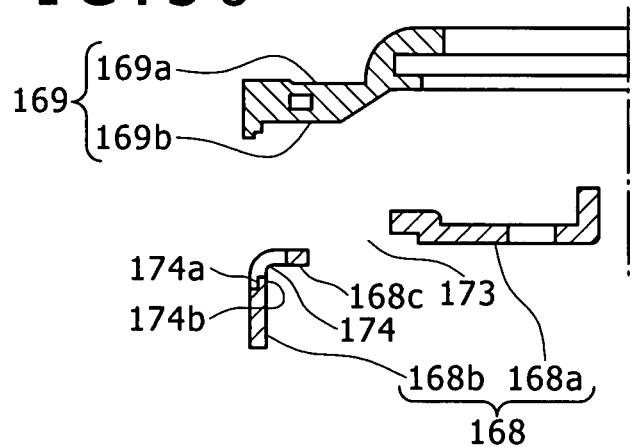
FIG. 30 is an exploded cross-sectional view of the respective major portions of a rotor of the spindle motor and a turn table.
Figure 31:
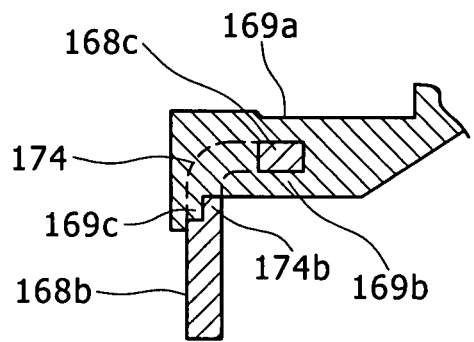
FIG. 31 is a cross-sectional view illustrating the respective major portions of the rotor of the spindle motor and the turn table which are assembled with each other.

The rotor assembly 167 broken down as shown in FIG. 30 includes the metallic rotor 168 and the disk table 169 made of a synthetic resin attached to the rotor 168 by outsert molding.

The rotor 168 includes an almost circular top surface portion 168a and cylindrical skirt portions 168b arranged at the outer circumferential portion of the top surface portion 168a so as to be spaced from each other at given intervals 173. The skirt portion 168b is formed at its upper end with a ring-like flange portion 168c by bending the upper end inwardly at an almost right angle.

The skirt portion 168b is formed with a first resin-introducing hole 174 at a bending portion, namely, at the upper end thereof. The first resin-introducing holes 174 are spaced apart from each other at given intervals in the circumferential direction of the cylindrical skirt portion 168b.

The disk table 169 includes a table main body portion 169a located on the outer surface side of the rotor 168 and a rotor inner surface-overlapping portion 169b located on the inner surface side of the rotor 168.

The disk table 169 is outsert molded by positioning the top surface portion 168a and cylindrical skirt portion 168b of the rotor 168 at a given interval 173 in a mold and pouring melted resin in the mold. With the interval 173 and the first resin-introducing hole 174, the inner surface of the table main body portion 169a is joined to the outer surface of the rotor inner surface-overlapping portion 169b. Thus, the bonding strength between the rotor 168 and the disk table 169 is increased. Incidentally, as shown in FIG. 30, a recess portion 174a is externally formed on the lower end side of the circumferential edge portion of the first resin-introducing hole 174 so as to form a thickness-reduced portion 174b on the inner surface side. This is because the thickness of a portion 169c of the table main body portion 169a corresponding to the recessed portion 174a is increased by introducing a portion of resin in the recess portion 174a during the outsert molding of the disk table 169, thereby strengthening the table main body portion 169a.

Figure 32:
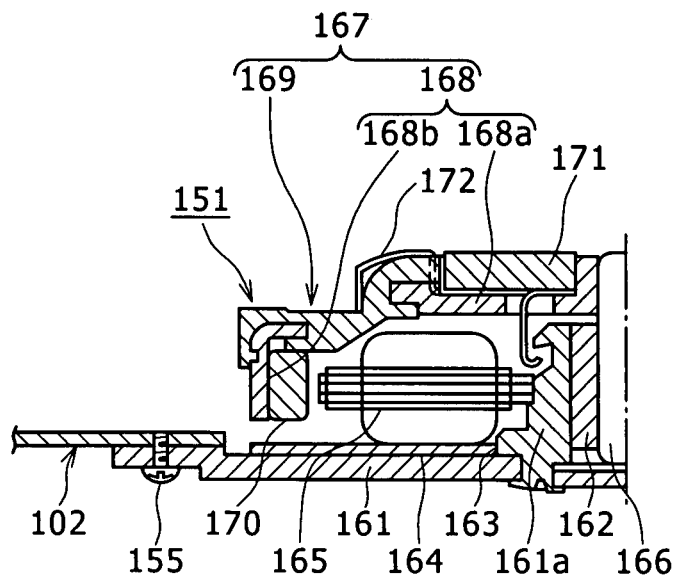
FIG. 32 is a cross-sectional view of a spindle motor according to a second embodiment.
Figure 33:
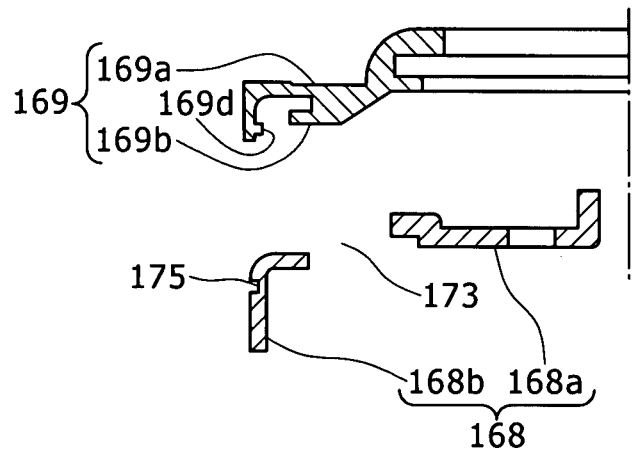
FIG. 33 is an exploded cross-sectional view illustrating the respective major portions of the rotor of the spindle motor and the turn table according to the second embodiment.
Figure 34:
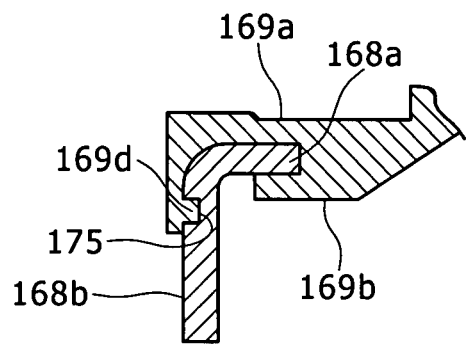
FIG. 34 is a cross-sectional view illustrating the respective major portions of the rotor of the spindle motor and the turn table according to the second embodiment which are assembled with each other.

FIGS. 32 to 34 illustrate another (a second) embodiment for increasing the bonding strength between the rotor 168 and the disk table 169. In this embodiment, a groove portion 175 is formed in the outer circumferential surface of the skirt portion 168b of the rotor 168 so as to receive therein a portion of a synthetic resin forming the turn table 169. When the disk table 169 is outsert molded, a portion 169d of the resin on the side of the table main body portion 169a is introduced in the groove portion 175 to thereby increase the bonding strength between the rotor 168 and the disk table 169. The other configurations are the same as those of the first embodiment. Therefore, the same constituent elements are denoted with the same reference numerals and the duplicated explanations are omitted.

Figure 35:
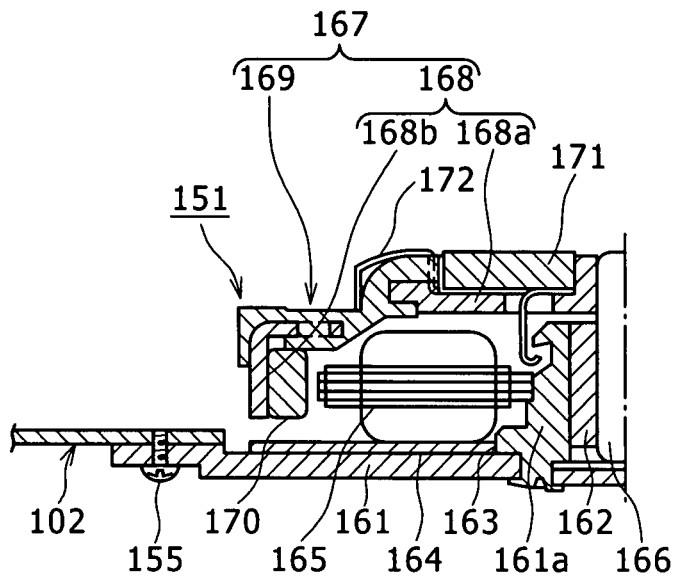
FIG. 35 is a cross-sectional view of a spindle motor according to a third embodiment.
Figure 36:
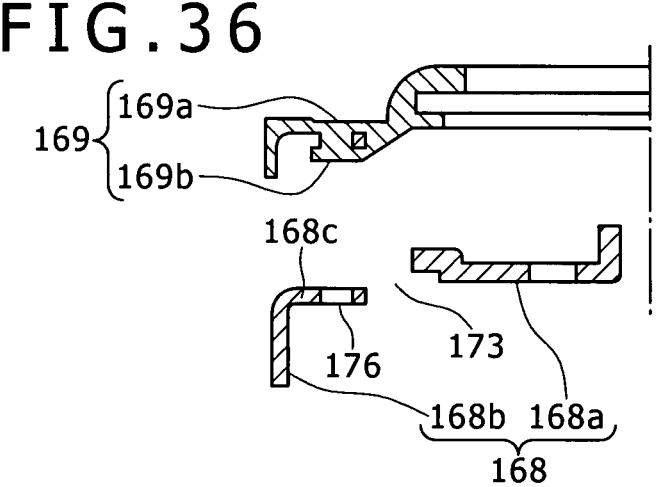
FIG. 36 is an exploded cross-sectional view illustrating the respective major portions of the rotor of the spindle motor and the turn table according to the third embodiment.
Figure 37:
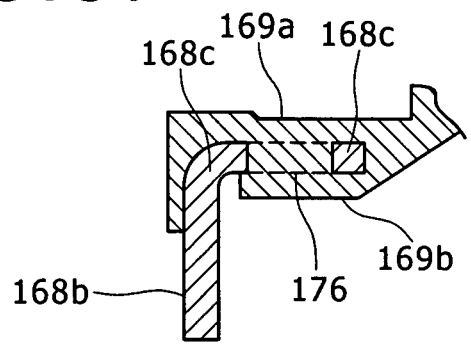
FIG. 37 is a cross-sectional view illustrating the respective major portions of the rotor of the spindle motor and the turn table according to the third embodiment which are assembled with each other.

FIGS. 35 to 37 illustrate another (a third) embodiment for increasing the bonding strength between the rotor 168 and the disk table 169. In this embodiment, a ring-like flange portion 168c provided on the upper end of the cylindrical skirt portion 168b is slightly increased in width than that of the first embodiment. In addition, the flange portion 168c is formed with a second resin-introducing hole 176.

When the rotor 168 is outsert molded with the disk table 169, the inner surface of the table main body portion 169a is bonded to the outer surface of the rotor inner surface-overlapping portion 169b through the second resin-introducing hole 176. Thus, the bonding strength between the rotor 168 and the disk table 169 is increased. The other configurations are the same as those of the first embodiment. Therefore, the same constituent elements are denoted with the same reference numerals and the duplicated explanations are omitted.

Figure 38:
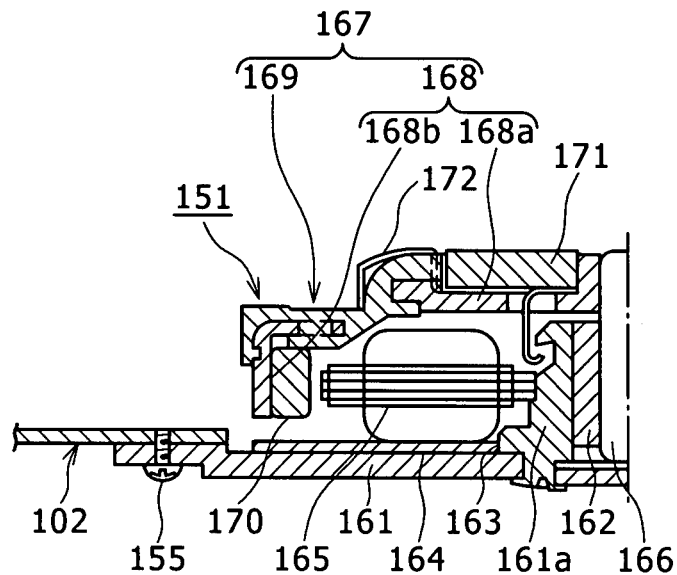
FIG. 38 is a cross-sectional view of a spindle motor according to a fourth embodiment.
Figure 39:
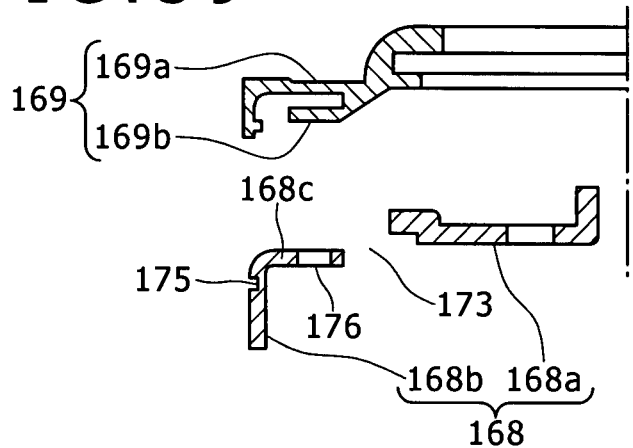
FIG. 39 is an exploded cross-sectional view illustrating the respective major portions of the rotor of the spindle motor and the turn table according to the fourth embodiment.
Figure 40:
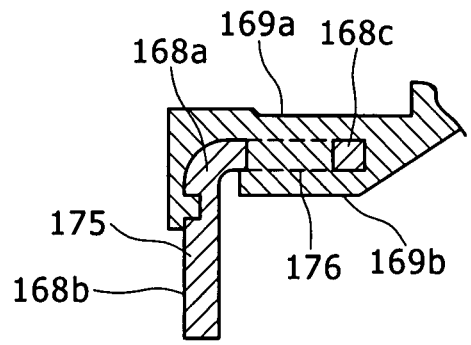
FIG. 40 is a cross-sectional view illustrating the respective major portions of the rotor of the spindle motor and the turn table according to the fourth embodiment which are assembled with each other.

FIGS. 38 to 40 illustrate another (a fourth) embodiment for increasing the bonding strength between the rotor 168 and the disk table 169. This embodiment is a combination of the second and third embodiments. The groove portion 175 is formed in the outer circumferential surface of the skirt portion 168b of the rotor 168 so as to receive therein a portion of a synthetic resin forming the turn table 169 and the flange portion 168c is formed with the second resin-introducing hole 176. Thus, this embodiment has the effect of the second embodiment as well as the effect of the third embodiment. The other configurations are the same as those of the second and third embodiments. Therefore, the same constituent elements are denoted with the same reference numerals and the duplicated explanations are omitted. The first and second embodiments may be combined into one. The embodiments described above describe the rotor 168 which is composed of the two components, namely, the top surface portion 168a and the cylindrical skirt portion 168b. However, alternatively, the top surface portion 168a may be formed integrally with the cylindrical skirt portion 168b and a hole for introducing resin may be formed between the top surface portion 168a and the cylindrical skirt portion 168b so as to correspond to the gap 173 as described above.

(6) Configuration of the Thread Motor

Figure 41:
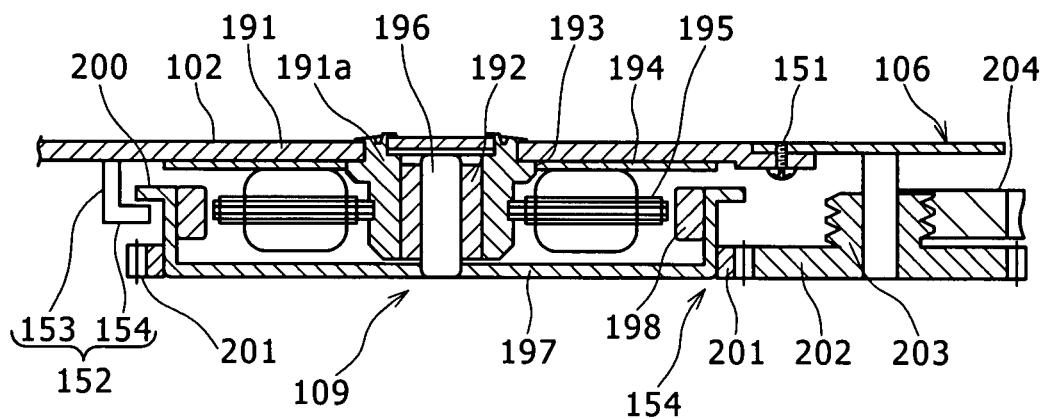
FIG. 41 is a cross-sectional view of a thread motor.

The thread motor allows the transmission gear group (gear train) described next to run the optical pickup. Referring to FIG. 41, the thread motor 109 is attached to a stator basal plate 191 as a motor support plate. The outer circumferential portion of the stator basal plate 191 and the lower surface of the chassis 106 are overlapped with each other and fastened to each other with screws or the like so that the thread motor 109 is installed so as to hang from the lower surface of the chassis 106.

The thread motor 109 includes a cylindrical bearing portion 191a provided on the stator basal plate 191; a bearing 192 attached to the inner circumferential portion of the bearing portion 191a; a wiring board 194 placed on the stator basal plate 191 with the bearing portion 191a inserted in a central hole 193; a core coil 195 attached to the outer circumferential portion of the bearing portion 191a; a rotor 197 rotatably attached to the bearing 192 with the rotational shaft 196 inserted into the bearing 192. A rotor magnet 198 paired with the core coil 195 is provided on the inner surface of the rotor 197.

Figure 42:
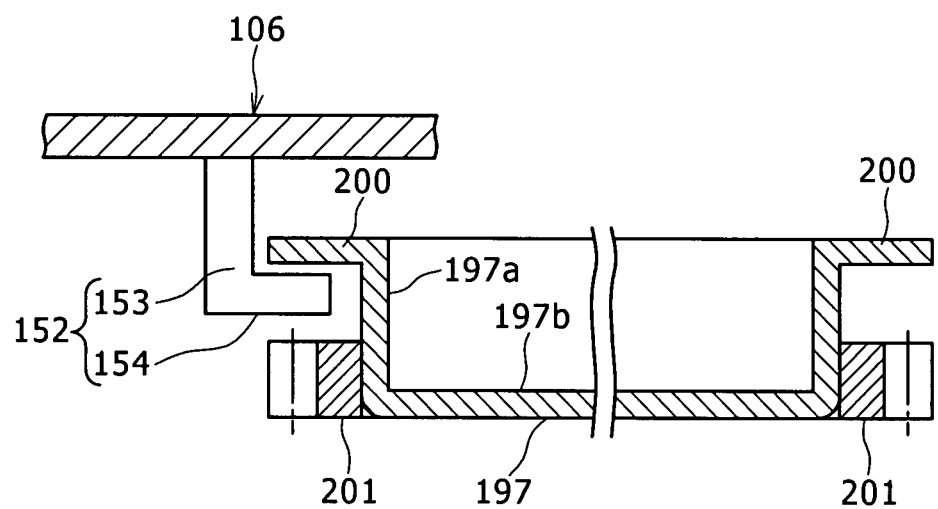
FIG. 42 is a cross-sectional view of a rotor of the thread motor.
Figure 43:
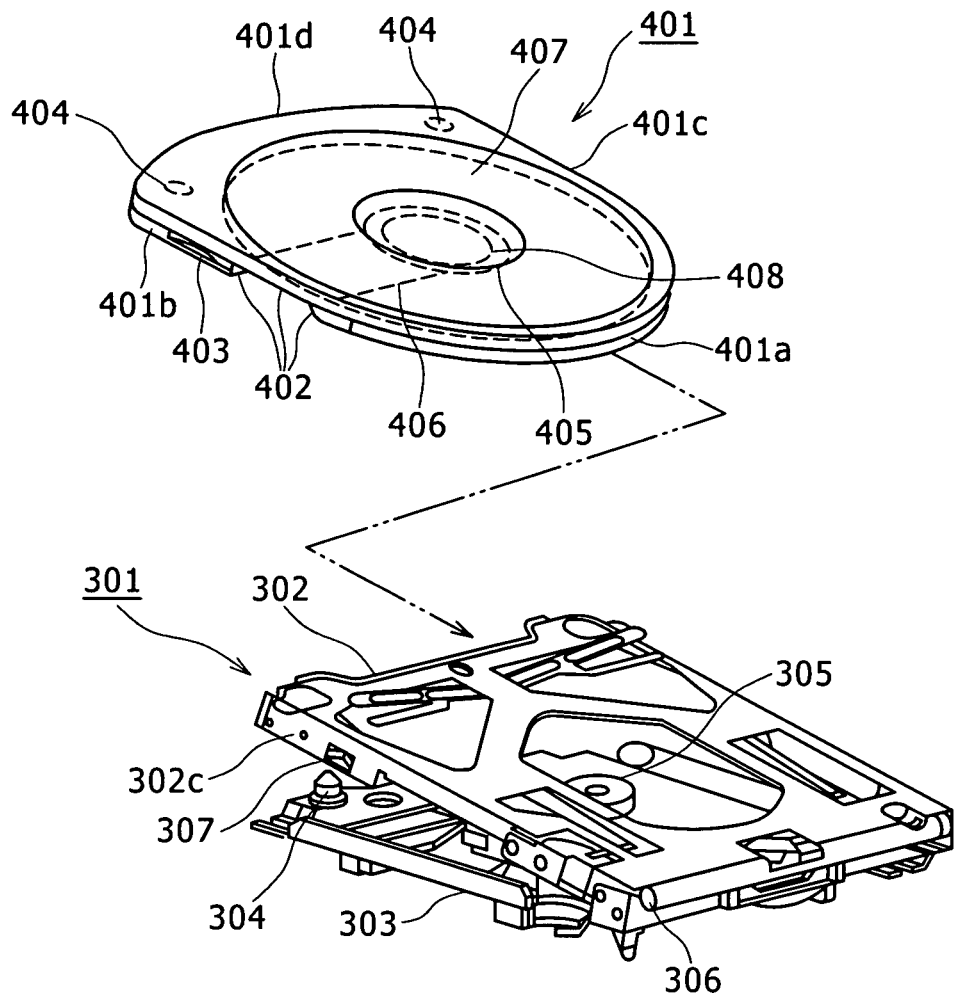
FIG. 43 is a perspective view of an existing recording-reproducing device by way of example.
Figure 44:
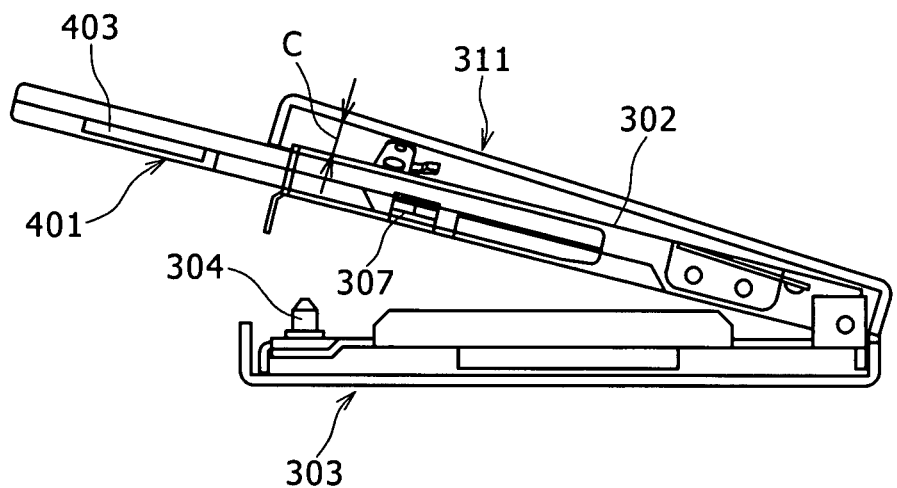
FIG. 44 is a lateral view of the existing recording-reproducing device by way of example.

Referring to FIG. 42, the rotor 197 is formed bottomed-cylindrical and has a first ring-like gear 201 which is located on the outer circumferential surface of a bottom surface portion 197b and at one end of a cylindrical portion 197a. In addition, the rotor 197 has a flange portion 200 which is located at the other end of the cylindrical portion 197a on a side opposite to the side of the bottom surface portion 197b so as to be spaced apart at a given distance from the ring-like gear 201.

The first ring-like gear 201 is attached to the outer surface of the rotor 197 by being outsert molded or fitted thereto. The flange portion 200 is formed by outwardly bending the opening side end of the rotor 197 at an almost right angle or by being outsert molded on the outer surface of the rotor 197.

The rotation of the thread motor 109 is transmitted to the optical pickup 108 through the transmission gear group 110 described later.

The thread motor 109 is prevented from falling from the chassis 106 due to the loosening screw 151 mentioned above by a motor-falling prevention portion 152. The motor-falling prevention portion 152 is composed of a vertical piece portion 153 and a horizontal piece portion 154 so as to be almost-L shaped. The vertical piece portion 153 is formed on the lower surface side of the chassis 106 so as to extend almost vertically along the outer circumferential surface of the thread motor 109. The horizontal piece portion 154 is formed by almost orthogonally bending the leading end portion of the vertical piece portion 153 toward the central portion of the thread motor 109. The tip of the horizontal piece portion 154 is inserted between the flange portion 200 and the ring-like gear 199 provided on the outer circumferential surface of the rotor 197.

The vertical piece portion 153 may be elastic so that the horizontal piece portion 154 does not impede the attachment of the thread motor 109 to the chassis 106 by bending the vertical piece portion 153 to bring the horizontal piece portion 154 into a non-interference state.

The motor-falling prevention portion 152 is formed by cutting and raising the chassis 106 and by being outsert molded on the chassis 106.

With the motor-falling prevention portion 152 configured described above, when the thread motor 109 moves in the direction of falling from the chassis 106, the horizontal piece portion 154 of the motor-falling prevention portion 152 comes into engagement with the flange portion 200 of the rotor 197 to prevent the further movement of the thread motor 109 in the falling direction. Thus, the thread motor 109 is prevented form falling from the chassis 106.

(7) Configuration of Transmission Gear Group (Gear Train)

The transmission gear group 110 transmits the rotation of the thread motor 109 to the optical pickup side to move the optical pickup 108. Referring to FIG. 8, the transmission gear group 110 includes a ring-like gear (hereinafter called the first gear) 201 provided on the outer circumferential surface of the rotor 197 included in the thread motor 109; a second gear 202 meshing with the first gear 201; a third gear 203 formed on the upper surface (the surface opposite to the chassis 102) of the second gear 202 to be coaxial therewith; a fourth gear meshing with the third gear 203; and a fifth gear 205 meshing with the fourth gear 204. The fifth gear 205 is attached to the end of the lead screw 185 of the optical pickup 108.

A flat plate-like gear (spur gear) is used as the second gear 202. A worm gear is used as the third gear 203. A shaft-like worm gear is used as the fourth gear 204. A worm gear is used as the fifth gear 205.

The fourth gear 204 is formed with a normal screw thread on one half-portion 204a and with an inverse screw thread on the other half-portion 204b with respect to the longitudinal central portion. The one half-portion 204a meshes with the third gear 203 and the other half-portion 204b meshes with the fifth gear 205. The thread motor 109 rotates the lead screw 185 through the first gear 201, second gear 202, third gear 203, fourth gear 204 and fifth gear 205, thereby moving the optical pickup 108.

As described above, the first ring-like gear 201 is provided on the outer circumferential surface of the rotor 197 included in the thread motor 109 and the second flat plate-like gear 202 is meshed with the first gear 201. Thus, the thread motor can be reduced in thickness as compared with the case where the first gear is provided on the bottom of the rotor by being put thereon, thereby reducing the size and thickness of the mechanical deck.

(8) Function and Effect

The recording-reproducing device 101 of the embodiment is configured described above. As shown in FIG. 1, the cabinet lid 103 is opened and the cartridge 1 is loaded into the mechanical deck 105. At this time, as shown in FIG. 11, the front surface 1a of the cartridge 1 is brought into contact with the first and second positioning projections 122, 123 of the erroneous insertion-preventing portion 121 to temporarily position the cartridge 1. Consequently, the tips of the positioning reference pins 111 come into contact with the lip of the positioning hole 13 included in the cartridge 1.

If the cartridge 1 is slightly pulled toward the rear surface 1*d* (in the direction of arrow "a") in such a state, the positioning reference pins 111 are fitted to the positioning holes 13 as shown in FIG. 12 to position the cartridge 1 in the back and force direction and in the left-and-right direction. In addition, the cartridge 1 is positioned in the height direction by the respective placement reference surfaces 124 provided on the base portions of the first and second positioning projections 122, 123 and by the placement reference surface 125 provided on the base portion of the positioning reference surface 125.

Figure 23:
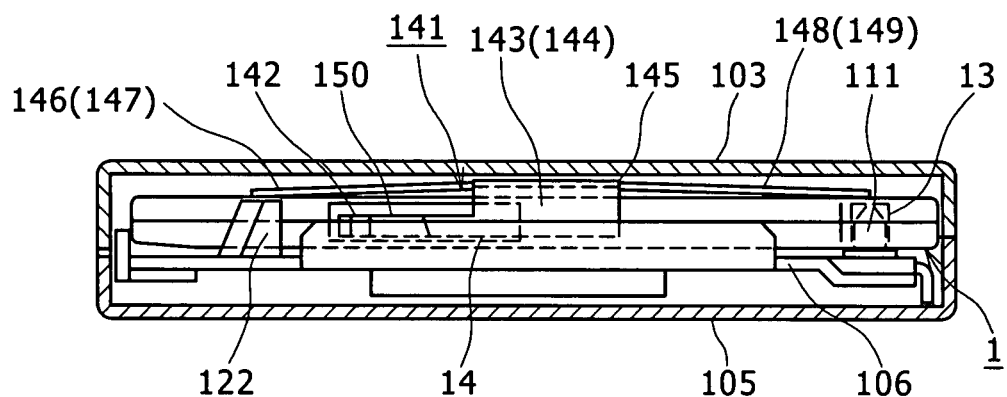
FIG. 23 is a cross-sectional view of the recording-reproducing device with the cabinet lid closed.
Figure 24:
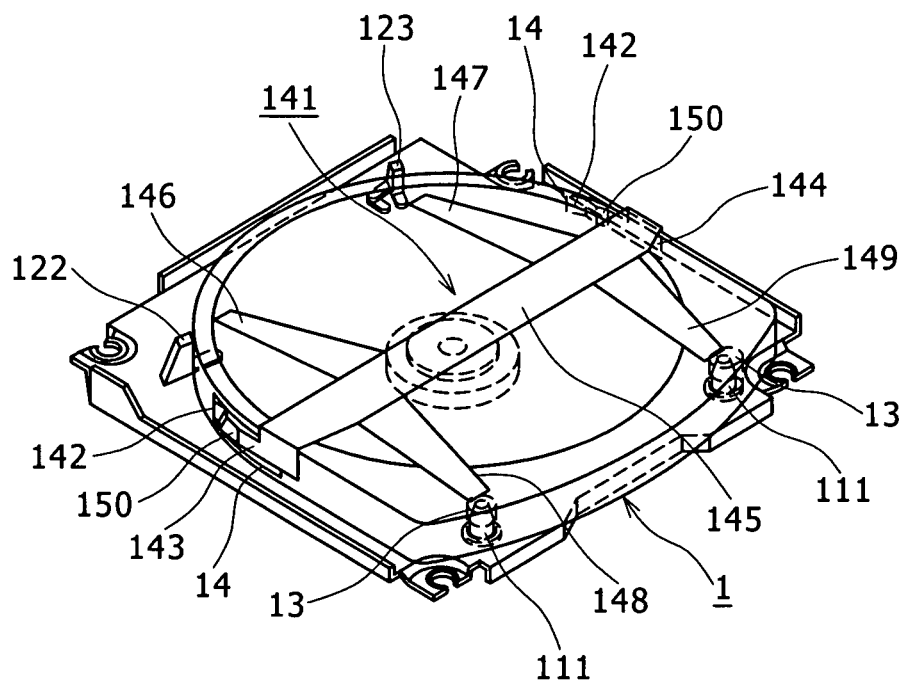
FIG. 24 is a perspective view illustrating operation of the cartridge ejection mechanism in the state where the cabinet lid is closed.

When the cabinet lid 103 is next closed, as shown in FIGS. 23 and 24, the engaging portions 142 of the first and second cartridge-retaining portions 143, 144 included in the cartridge ejection mechanism 141 are respectively engaged with the retaining member engaging grooves 14 provided in the first and second lateral surfaces 1*b*, 1*c* of the cartridge 1. In addition, the tips of the first through fourth cartridge pressing portion 146 through 149 press the chassis 106 of the mechanical deck 105. Recording or reproduction is performed in this state.

If the cabinet lid 103 is opened after the completion of the recording or reproduction, as shown in FIGS. 25 to 27, the cartridge 1 is raised together with the cabinet lid 103 from the chassis 106 of the mechanical deck 105 by the first and second cartridge retaining portions 143, 144 whose respective engaging portions 142 are engaged with the retaining member-engaging grooves 14 provided in the first and second lateral surfaces 1*b*, 1*c* of the cartridge 1 and taken out from the mechanical deck 105.

It should be understood by those skilled in the art that various modifications, combinations, sub-combinations and alternations may occur depending on design requirements and other factors insofar as they are within the scope of the appended claims or the equivalents.

What is claimed is:

1. A reproducing device comprising:
   a mechanical deck, the mechanical deck comprising a chassis, the chassis comprising an erroneous insertion-preventing portion,
   wherein the mechanical deck is configured to perform an operation on a recording medium cartridge placed directly on the chassis, and the erroneous insertion-preventing portion is configured to conform to a curved shape of a front surface of the recording medium cartridge,
   wherein the erroneous insertion-preventing portion is configured to contact the recording medium cartridge at two or more points which lie along an arc that coincides with an outermost perimeter of the front surface of the recording medium cartridge, and
   further comprising an optical pickup, wherein the optical pickup is configured to perform the operation on the recording medium cartridge by recording data to a recording medium included in the recording medium cartridge, or by reproducing data from the recording medium included in the recording medium cartridge.

2. The reproducing device according to claim 1, wherein the erroneous insertion-preventing portion comprises a plurality of positioning projections configured to contact a plurality of portions of the front surface of the recording medium cartridge at a time of insertion of the recording medium cartridge.

3. The reproducing device according to claim 2, wherein a placement reference surface of a base portion of a first positioning projection of the plurality of positioning projections is configured to contact the recording medium cartridge.

4. The reproducing device according to claim 3, wherein the first positioning projection and the placement reference surface thereof are made of a synthetic resin and outsert molded on the chassis of the mechanical deck.

5. The reproducing device according to claim 1, wherein
   the chassis further comprises a positioning reference pin; and
   an end portion of the positioning reference pin is configured to:
   contact a circumferential edge portion of a positioning hole in a lower surface of the recording medium cartridge when the front surface of the recording medium cartridge is directed downwardly, slanted at an angle and brought into contact with the erroneous insertion-preventing portion, and
   fit into the positioning hole when the front surface of the recording medium cartridge is separated from the erroneous insertion-preventing portion at a distance.

6. The reproducing device of claim 1, wherein the recording medium cartridge is placed directly on the chassis when no portion of a lower surface of the recording medium cartridge rests on any portion of the reproducing device other than the chassis.

7. The reproducing device according to claim 1, wherein the erroneous insertion-preventing portion being configured to conform to the curved shape of the front surface of the recording medium cartridge comprises at least at a curved portion of the erroneous insertion- preventing portion being configured to conform to the curved shape of the front surface of the recording medium cartridge.

8. The reproducing device according to claim 7, wherein the curved portion is formed hollow by vacuum molding a synthetic resin plate, and wherein the curved portion is provided on the chassis via a base plate portion continuous to a lower end of the curved portion so as to extend upright.

9. The reproducing device of claim 1, wherein the erroneous insertion-preventing portion comprises a concave surface.

10. The reproducing device of claim 1, further comprising a spindle motor configured to chuck the recording medium included in the recording medium cartridge, wherein the spindle motor is configured to rotate the recording medium.

11. The reproducing device of claim 10, wherein the spindle motor is configured to chuck the recording medium by chucking a magnetic chucking hub attached to the recording medium.

12. The reproducing device of claim 1, wherein the mechanical deck comprises the optical pickup.

13. A reproducing device for use with a recording medium cartridge, the recording medium cartridge having a front surface formed in a first arcuate curve, left and right lateral surfaces being continuous to the front surface to have flat surfaces parallel to each other, and a rear surface being opposite to the front surface and continuous to the lateral surfaces and formed in a second arcuate curve, the second arcuate curve having a radius of curvature greater than that of the first arcuate curve, the reproducing device comprising:
   a mechanical deck, the mechanical deck comprising a chassis, the chassis comprising an erroneous insertion-preventing portion,
   wherein the mechanical deck is configured to perform an operation on the recording medium cartridge placed directly on the chassis, and the erroneous insertion-preventing portion is configured to conform to the first arcuate curve of the front surface of the recording medium cartridge, wherein the erroneous insertion-preventing portion comprises a plurality of positioning projections configured to contact a plurality of portions of the front surface of the recording medium cartridge at a time of insertion of the recording medium cartridge, and further comprising an optical pickup, wherein the optical pickup is configured to perform the operation on the recording medium cartridge by recording data to a recording medium included in the recording medium cartridge, or by reproducing data from the recording medium included in the recording medium cartridge.

14. The reproducing device according to claim 13, wherein a placement reference surface of a base portion of a first positioning projection of the plurality of positioning projections is configured to contact the recording medium cartridge.

15. The reproducing device according to claim 13, wherein the chassis further comprises a positioning reference pin; and an end portion of the positioning reference pin is configured to:

contact a circumferential edge portion of a positioning hole in a lower surface of the recording medium cartridge when the front surface of the recording medium cartridge is directed downwardly, slanted at an angle and brought into contact with the erroneous insertion-preventing portion, and fit into the positioning hole when the front surface of the recording medium cartridge is separated from the erroneous insertion-preventing portion at a distance.

16. The reproducing device of claim 13, wherein the recording medium of the recording medium cartridge is an optical disk.

17. The reproducing device of claim 13, further comprising a spindle motor configured to chuck the recording medium included in the recording medium cartridge, wherein the spindle motor is configured to rotate the recording medium.

18. The reproducing device of claim 17, wherein the spindle motor is configured to chuck the recording medium by chucking a magnetic chucking hub attached to the recording medium.

19. The reproducing device of claim 13, wherein the mechanical deck comprises the optical pickup.

20. A reproducing device for use with a recording medium cartridge, the recording medium cartridge having a front surface formed in a first arcuate curve, left and right lateral surfaces being continuous to the front surface to have flat surfaces parallel to each other, and a rear surface being opposite to the front surface and continuous to the lateral surfaces and formed in a second arcuate curve, the second arcuate curve having a radius of curvature greater than that of the first arcuate curve, the reproducing device comprising:

a mechanical deck, the mechanical deck comprising a chassis, the chassis comprising an erroneous insertion-preventing portion, wherein the mechanical deck is configured to perform an operation on the recording medium cartridge placed directly on the chassis, and the erroneous insertion-preventing portion is configured to conform to the first arcuate curve of the front surface of the recording medium cartridge, wherein the erroneous insertion-preventing portion is configured to contact the recording medium cartridge at two or more points which lie along an arc that coincides with an outermost perimeter of the front surface of the recording medium cartridge, and further comprising an optical pickup, wherein the optical pickup is configured to perform the operation on the recording medium cartridge by recording data to a recording medium included in the recording medium cartridge, or by reproducing data from the recording medium included in the recording medium cartridge.

21. The reproducing device of claim 20, further comprising a spindle motor configured to chuck the recording medium included in the recording medium cartridge, wherein the spindle motor is configured to rotate the recording medium.

22. The reproducing device of claim 21, wherein the spindle motor is configured to chuck the recording medium by chucking a magnetic chucking hub attached to the recording medium.

23. The reproducing device of claim 20, wherein the mechanical deck comprises the optical pickup.

* * * * *